(12) United States Patent
Barrick et al.

(10) Patent No.: US 10,838,432 B2
(45) Date of Patent: Nov. 17, 2020

(54) SYSTEM AND METHOD FOR MONITORING FRAME LEVELNESS OF AN AGRICULTURAL IMPLEMENT

(71) Applicant: CNH Industrial Canada, Ltd., Saskatoon (CA)

(72) Inventors: Christopher Barrick, Morton, IL (US); James W. Henry, Saskatchewan (CA); Yong Deng, Peoria, IL (US)

(73) Assignee: CNH Industrial Canada, Ltd., Saskatoon (CA)

( * ) Notice: Subject to any disclaimer, the term of this patent is extended or adjusted under 35 U.S.C. 154(b) by 260 days.

(21) Appl. No.: 15/880,613

(22) Filed: Jan. 26, 2018

(65) Prior Publication Data
US 2019/0235529 A1 Aug. 1, 2019

(51) Int. Cl.
*G05D 1/08* (2006.01)
*A01B 63/14* (2006.01)
(Continued)

(52) U.S. Cl.
CPC ......... *G05D 1/0891* (2013.01); *A01B 59/002* (2013.01); *A01B 63/14* (2013.01);
(Continued)

(58) Field of Classification Search
CPC ....... A01B 63/00; A01B 63/002; A01B 63/11; A01B 63/1117; A01B 63/114; A01B 7/00;
(Continued)

(56) References Cited

U.S. PATENT DOCUMENTS 2,887,166 A * 5/1959 Vogelaar ............... A01B 63/114
                                                                      172/9
2,887,167 A * 5/1959 Heitshu ............... A01B 63/1117
                                                                      172/9
(Continued)

FOREIGN PATENT DOCUMENTS

WO    WO 2017/158006    9/2017

OTHER PUBLICATIONS

John Deere "AccuDepth System Performs All Depth Control and Frame-Leveling Functions" Dated Dec. 10, 2017 (3 pages).
John Deere "1870 Air Hoe Drill" Dated Dec. 10, 2017 (4 pages).

*Primary Examiner* — Jessica H Lutz
(74) *Attorney, Agent, or Firm* — Rebecca L. Henkel; Rickard K. DeMille

(57) ABSTRACT

A system for monitoring frame levelness of an agricultural implement may include first and second sensors configured to detect first and second parameters indicative of forces exerted on first and second ground engaging tools of the implement by the ground, respectively. The system may also include a controller configured to monitor a parameter differential between the first and second parameters based on measurement signals received from the first and second sensors, with the monitored parameter differential being indicative of at least one of pitch or roll of a frame of the implement. The controller may be further configured initiate a control action associated with adjusting the pitch and/or the roll of the frame based on a magnitude of the monitored parameter differential to adjust an orientation of the frame relative to the ground.

17 Claims, 11 Drawing Sheets

(51) Int. Cl.
    *A01B 59/00*    (2006.01)
    *A01B 63/16*    (2006.01)
    *A01B 79/00*    (2006.01)
    *A01B 73/02*    (2006.01)
    *A01B 49/02*    (2006.01)
    *A01B 7/00*    (2006.01)

(52) U.S. Cl.
    CPC ............ *A01B 63/16* (2013.01); *A01B 79/005*
    (2013.01); *A01B 7/00* (2013.01); *A01B 49/027*
    (2013.01); *A01B 73/02* (2013.01); *G05D*
    *2201/0201* (2013.01)

(58) Field of Classification Search
    CPC ..... A01B 49/027; A01B 73/02; A01B 79/005;
    A01B 70/005; A01B 59/002; A01B
    63/14; A01B 63/16; G05D 1/0891; G05D
    2201/0201
    See application file for complete search history.

(56) References Cited

U.S. PATENT DOCUMENTS

| | | | | |
|---|---|---|---|---|
| 4,508,178 | A * | 4/1985 | Cowell | A01B 63/114 |
| | | | | 172/239 |
| 4,657,087 | A * | 4/1987 | Livneh | A01B 69/008 |
| | | | | 114/144 A |
| 5,372,204 | A * | 12/1994 | Schiess | A01B 63/1117 |
| | | | | 137/45 |
| 6,218,737 | B1 * | 4/2001 | Adamek | A01B 59/004 |
| | | | | 307/10.1 |
| 6,378,620 | B1 * | 4/2002 | Luca | A01B 63/112 |
| | | | | 172/4 |
| 6,612,375 | B2 * | 9/2003 | Rogala | A01B 63/10 |
| | | | | 172/8 |
| 6,698,524 | B2 * | 3/2004 | Bernhardt | A01B 15/14 |
| | | | | 172/7 |
| 7,835,832 | B2 * | 11/2010 | Macdonald | A01B 69/008 |
| | | | | 701/24 |
| 8,827,001 | B2 | 9/2014 | Wendte et al. | |
| 8,857,530 | B2 | 10/2014 | Henry | |
| 9,113,589 | B2 | 8/2015 | Bassett | |
| 9,510,498 | B2 | 12/2016 | Tuttle et al. | |
| 9,554,504 | B2 | 1/2017 | Houck | |
| 9,572,296 | B2 | 2/2017 | Henry et al. | |
| 9,585,298 | B2 | 3/2017 | Henry et al. | |
| 9,609,799 | B2 | 4/2017 | Henry | |
| 9,609,800 | B2 | 4/2017 | Henry | |
| 9,615,499 | B2 | 4/2017 | Kowalchuk et al. | |
| 9,674,999 | B2 | 6/2017 | Achen et al. | |
| 10,444,774 | B2 * | 10/2019 | Bassett | G05D 16/2026 |
| 2008/0195268 | A1 * | 8/2008 | Sapilewski | A01B 69/004 |
| | | | | 701/23 |
| 2011/0036281 | A1 * | 2/2011 | Beaujot | A01B 63/16 |
| | | | | 111/149 |
| 2013/0046419 | A1 * | 2/2013 | Anderson | G07C 9/00039 |
| | | | | 701/2 |
| 2015/0302305 | A1 * | 10/2015 | Rupp | A01B 79/005 |
| | | | | 706/46 |
| 2016/0143209 | A1 * | 5/2016 | Jagow | A01B 63/145 |
| | | | | 172/1 |
| 2017/0215327 | A1 * | 8/2017 | Gschwendtner | A01B 63/00 |
| 2017/0231146 | A1 * | 8/2017 | Romig | A01B 59/002 |
| | | | | 172/1 |
| 2017/0251587 | A1 | 9/2017 | Sporrer et al. | |
| 2017/0316692 | A1 * | 11/2017 | Rusciolelli | G08G 1/164 |
| 2017/0325393 | A1 * | 11/2017 | Gschwendtner | A01B 63/1117 |
| 2017/0359941 | A1 * | 12/2017 | Czapka | A01B 63/22 |
| 2018/0325011 | A1 * | 11/2018 | Connell | A01C 7/201 |
| 2018/0325020 | A1 * | 11/2018 | Connell | A01B 63/28 |
| 2018/0325021 | A1 * | 11/2018 | Connell | A01C 7/201 |
| 2019/0104675 | A1 * | 4/2019 | Shinkai | A01B 63/112 |
| 2019/0126912 | A1 * | 5/2019 | Peterson | A01B 59/042 |
| 2019/0176559 | A1 * | 6/2019 | Bittner | B60G 17/0165 |
| 2019/0343032 | A1 * | 11/2019 | Stanhope | A01B 79/005 |

\* cited by examiner

SYSTEM AND METHOD FOR MONITORING FRAME LEVELNESS OF AN AGRICULTURAL IMPLEMENT

FIELD

The present disclosure generally relates to agricultural implements and, more particularly, to systems and methods for monitoring frame levelness of an agricultural implement based on a monitored parameter differential between two or more of the implement's ground engaging tools.

BACKGROUND

It is well known that, to attain the best agricultural performance from a field, a farmer must cultivate the soil, typically through a tillage operation. Modern farmers perform tillage operations by pulling a tillage implement behind an agricultural work vehicle, such as a tractor. As such, the tillage implement typically includes a plurality of wheels to facilitate towing of the implement. The wheels may be mounted at various locations on a frame of the implement to support the implement relative to the ground. Additionally, tillage implements generally include a plurality of ground engaging tools coupled to the frame that are configured to penetrate the soil to a particular depth. The ground engaging tools may be spaced apart from each other on the frame so as to provide uniform tilling to the swath of field over which the implement is towed.

When performing a tillage operation, it is desirable to create a level and uniform layer of tilled soil across the field to form a proper seedbed for subsequent planting operations. However, variations in one or more operating parameters of the implement may cause the ground engaging tools to penetrate the ground to differing depths, thereby resulting in an uneven seedbed. Unfortunately, current tillage systems fail to account for such variations in the implement's operating parameters when performing a tillage operation.

Accordingly, an improved system and method for monitoring the frame levelness of an agricultural implement would be welcomed in the technology.

BRIEF DESCRIPTION

Aspects and advantages of the technology will be set forth in part in the following description, or may be obvious from the description, or may be learned through practice of the technology.

In one aspect, the present subject matter is directed to a system for monitoring frame levelness of an agricultural implement. The system may include an implement having a frame extending in a longitudinal direction between a forward end and an aft end and in a lateral direction between a first side and a second side. The implement may also include first and second ground engaging tools coupled to the frame, with the first and second ground engaging tools being spaced apart from each other in at least one of the longitudinal direction or the lateral direction of the implement. Furthermore, the system may include a first sensor configured to detect a first parameter indicative of a force exerted on the first ground engaging tool by the ground and a second sensor configured to detect a second parameter indicative of a force exerted on the second ground engaging tool by the ground. Additionally, the system may include a controller communicatively coupled to the first and second sensors. The controller may be configured to monitor a parameter differential between the first and second parameters based on measurement signals received from the first and second sensors, with the monitored parameter differential being indicative of at least one of the pitch or roll of the frame. The controller may be further configured initiate a control action associated with adjusting the at least one of pitch or the roll of the frame based on a magnitude of the monitored parameter differential to adjust an orientation of the frame relative to the ground.

In another aspect, the present subject matter is directed to a method for monitoring frame levelness an agricultural implement. The implement may include a frame extending in a longitudinal between a forward end and an aft end and in a lateral direction between a first side and a second side. The implement may further include first and second ground engaging tools coupled to the frame. The first and second ground engaging tools may be spaced apart from each other in at least one of the longitudinal direction or the lateral direction of the implement. The method may include receiving, with a computing device, data associated with a first parameter indicative of a force exerted on the first ground engaging tool by the ground and a second parameter indicative of a force exerted on the second ground engaging tool by the ground. The method may also include monitoring, with the computing device, a parameter differential between the first and second parameters, with the monitored parameter differential being indicative of at least one of pitch or roll of the frame. Furthermore, the method may include initiating, with the computing device, a control action associated with adjusting the at least one of pitch or the roll of the frame based on a magnitude of the monitored parameter differential to adjust an orientation of the frame relative to the ground.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
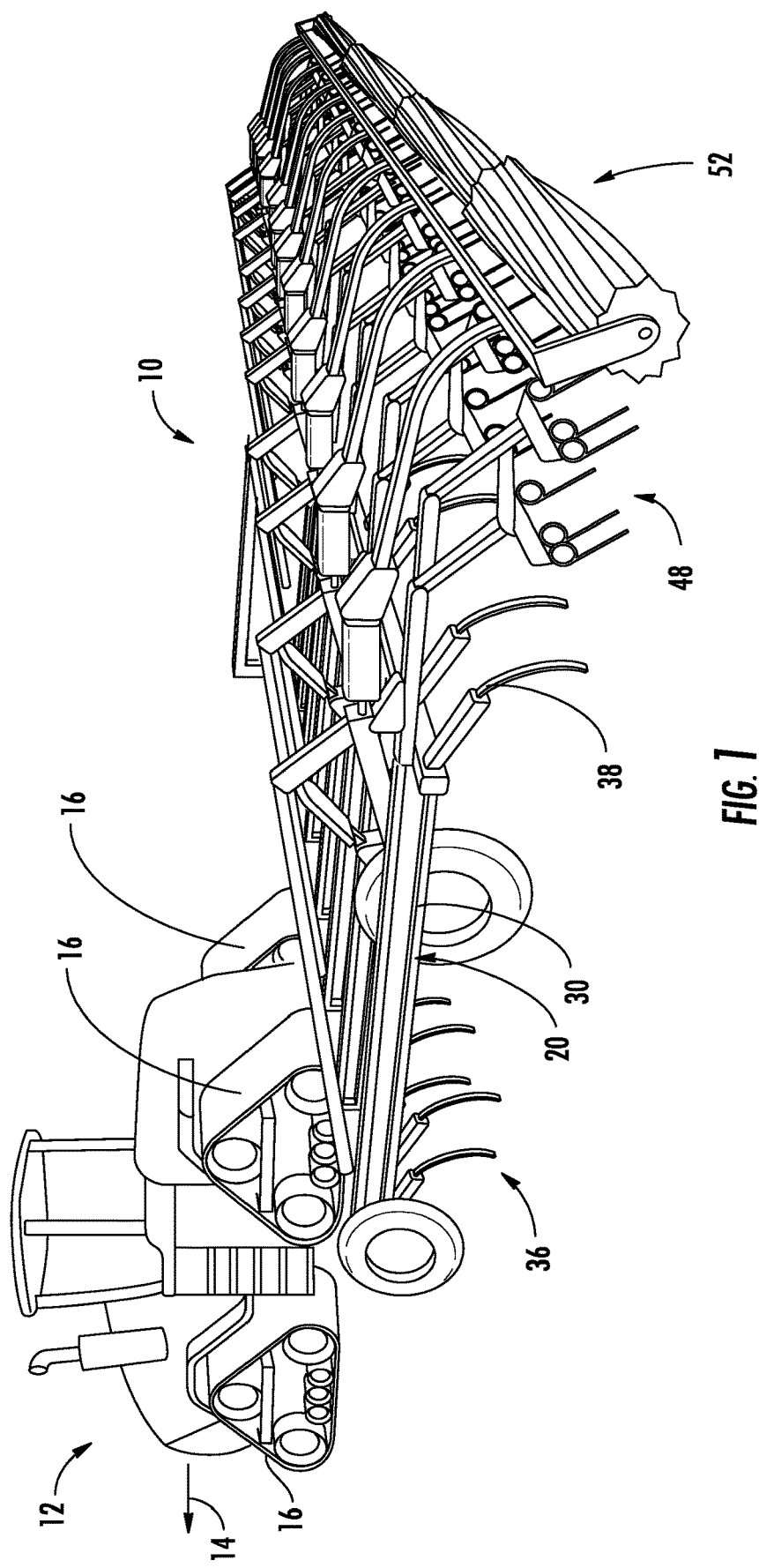
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring frame levelness of an agricultural implement based on monitored parameters associated with two or more ground engaging tools of the implement. Specifically, in several embodiments, a controller of the disclosed system may be configured to monitor a first parameter indicative of a force exerted on a first ground engaging tool of the implement by the soil or ground and a second parameter indicative of a force exerted on a second ground engaging tool of the implement by the soil or ground so as to determine a parameter differential between the first and second parameters. Based on the relative positioning of the ground engaging tools on the implement's frame, the parameter differential may, in turn, be indicative of pitching of the frame in a longitudinal direction and/or rolling of the frame in a lateral direction. For example, if the first monitored parameter is greater than the second monitored parameter, the controller may determine that the implement frame has pitched and/or rolled relative to a desired orientation or levelness of the frame relative to the ground. Thus, when it is determined that the parameter differential existing between the first and second ground engaging tools exceeds a maximum parameter differential threshold set for the implement or falls below a minimum parameter differential threshold set for the implement, the controller may be configured to initiate a control action associated with adjusting the amount of pitch and/or the roll of the frame, thereby allowing the frame orientation or levelness relative to the ground to be adjusted. For instance, the controller may be configured to adjust the position of one component of the implement (e.g., a wheel or a hitch assembly of the implement) relative to another component of the implement (e.g., the frame) to reduce the amount of pitch and/or roll of the frame in an attempt to correct the frame orientation or levelness.

Figure 2:
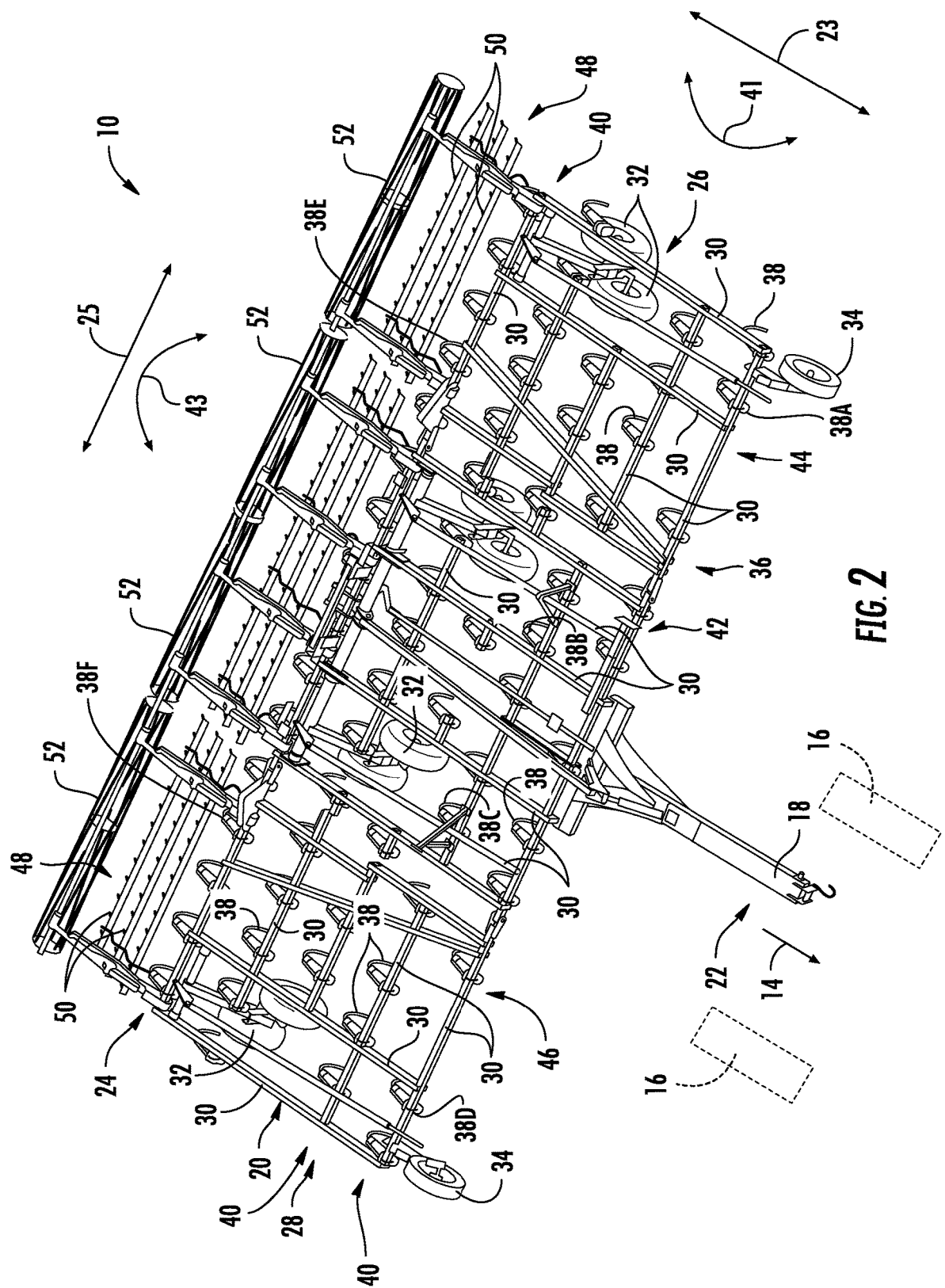
FIG. 2 illustrates a perspective view of the agricultural implement shown in FIG. 1, particularly illustrating various components of the implement.

Referring now to the drawings, FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field along a direction of travel 14 by the work vehicle 12. As shown, the work vehicle 12 may be configured as an agricultural tractor having a plurality of track assemblies 16 for use in traversing the field. It should be appreciated, however, that the work vehicle 12 may be configured as any suitable work vehicle, such as a wheeled vehicle. The implement 10 may be coupled to the work vehicle 12 via a pull hitch 18 or using any other suitable attachment means. As will be described below, the pull hitch 18 may be coupled to a corresponding adjustable hitch assembly (not shown) of the work vehicle 12.

In general, the implement 10 may include an implement frame 20. As shown in FIG. 2, the frame 20 may extend along a longitudinal direction 23 between a forward end 22 and an aft end 24. The frame 20 may also extend along a lateral direction 25 (FIG. 2) between a first side 26 and a second side 28. In this respect, the frame 20 generally includes a plurality of structural frame members 30, such as beams, bars, and/or the like, configured to support or couple to a plurality of components. Additionally, a plurality of wheel assemblies may be coupled to the frame 20, such as a set of centrally located wheels 32 and a set of front pivoting wheels 34, to facilitate towing the implement 10 in the direction of travel 14.

In one embodiment, the frame 20 may be configured to support a cultivator 36, which may be configured to till or otherwise break the soil over which the implement 10 travels to create a seedbed. In this respect, the cultivator 36 may include a plurality of ground engaging tools 38, which are pulled through the soil as the implement 10 moves across the field in the direction of travel 14. As will be discussed in greater detail below, the ground engaging tools 38 may be configured to be pivotally mounted to the frame 20 to allow the ground engaging tools 38 to pivot out of the way of rocks or other impediments in the soil. As shown, the ground engaging tools 38 may be arranged into a plurality of ranks 40, which are spaced apart from one another along the longitudinal direction 23 between the forward end 22 and the aft end 24 of the frame 20. Furthermore, within each of the ranks 40, the ground engaging tools 38 may be spaced apart from one another along the lateral direction 25 between the first side 26 and the second side 28 of the frame 20.

For example, as shown in FIG. 2, in one embodiment, the implement may include the ground engaging tools 38A, 38B, 38C, 38D, 38E, 38F. More specifically, the ground engaging tools 38A, 38B, 38C, 38D, 38E, 38F may be spaced apart from one another along the lateral direction 25 of the implement 10 between the first side 26 and the second side 28 of the frame 20. As particularly shown in FIG. 2, the ground engaging tools 38A, 38B, 38C, 38D, 38E, 38F may be spaced apart from the tracks 16 of the work vehicle 12 (e.g., with the tracks 16 being indicated by dashed boxes in FIG. 2) along the lateral direction 25 of the implement 10 so as to prevent soil compaction caused by the tracks 16 from affecting the frame levelness monitoring. In addition, one or more of the ground engaging tools 38, such tools 38A, 38D, may be spaced apart from the ground engaging tools 38C, 38D along the longitudinal direction 23 of the implement 10. Similarly, the ground engaging tools 38C, 38D may be spaced apart from the ground engaging tools 38E, 38F along the longitudinal direction 23 of the implement 10. Furthermore, the ground engaging tools 38B, 38C may be coupled to the main section 42 of the frame 20, while the ground engaging tools 38A, 38E may be coupled to the first wing section 44 of the frame 20 and the ground engaging tools 38D, 38F may be coupled to second wing 46 of the frame 20. However, it should be appreciated that, in alternative embodiments, the implement 10 may include any other suitable arrangement of ground engaging tools 38.

In general, as described above, it may be desirable that the implement frame 20 remains or substantially level relative to the ground. As such, the levelness of the frame 20 may be generally defined by a pitch of the frame 20 (e.g., as indicated by arrow 41 in FIG. 2) and/or a roll (e.g., as indicated by arrow 43 in FIG. 2) of the frame 20. More specifically, the pitch 41 of the frame 20 may be a differential in the heights of the forward and aft ends 22, 24 of the frame 20 in the longitudinal direction 23 of the implement 10. That is, the frame 20 may be rolled when one of the forward or aft ends 22, 24 of the frame 20 is closer to the ground than the other of forward or aft ends 22, 24 of the frame 20. Additionally, the roll 43 of the frame 20 may be a differential in the heights of the first and second sides 26, 28 of frame 20 in the lateral direction 25 of the implement 10. That is, the frame 20 may be rolled when the one of the first and second sides 26, 28 of the frame 20 is closer to the ground than the other of first and second sides 26, 28 of the frame 20.

In several embodiments, the frame 20 may include one or more sections. As illustrated in FIG. 2, for example, the frame 20 may include a main section 42 positioned centrally between the first and second sides 26, 28 of the frame 20. The frame 20 may also include a first wing section 44 positioned proximate to the first side 26 of the frame 20. Similarly, the frame 20 may also include a second wing section 46 positioned proximate to the second side 28 of the frame 20. The first and second wing sections 44, 46 may be pivotally coupled to the main section 42 of the frame 20. In this respect, the first and second wing sections 44, 46 may be configured to fold up relative to the main section 42 to reduce the lateral width of the implement 10 to permit, for example, storage or transportation of the implement on a road. In should be appreciated that the frame 20 may include any suitable number of wing sections.

Moreover, as shown in FIGS. 1 and 2, the implement 10 may also include one or more harrows 48. As is generally understood, the harrows 48 may be configured to be pivotally coupled to the frame 20. The harrows 48 may include a plurality of ground engaging elements 50, such as tines or spikes, which are configured to level or otherwise flatten any windrows or ridges in the soil created by the cultivator 36. Specifically, the ground engaging elements 50 may be configured to be pulled through the soil as the implement 10 moves across the field in the direction of travel 14. It should be appreciated that the implement 10 may include any suitable number of harrows 48. In fact, some embodiments of the implement 10 may not include any harrows 48.

Moreover, in one embodiment, the implement 10 may optionally include one or more baskets or rotary firming wheels 52. As is generally understood, the baskets 52 may be configured to reduce the number of clods in the soil and/or firm the soil over which the implement 10 travels. As shown, each basket 52 may be configured to be pivotally coupled to one of the harrows 48. Alternately, the baskets 52 may be configured to be pivotally coupled to the frame 20 or any other suitable location of the implement 10. It should be appreciated that the implement 10 may include any suitable number of baskets 52. In fact, some embodiments of the implement 10 may not include any baskets 52.

It should be appreciated that the configuration of the implement 10 described above and shown in FIGS. 1 and 2 is provided only to place the present subject matter in an exemplary field of use. Thus, it should be appreciated that the present subject matter may be readily adaptable to any manner of implement configuration. For example, in one embodiment, the implement 10 may be configured as a disk harrow.

Figure 3:
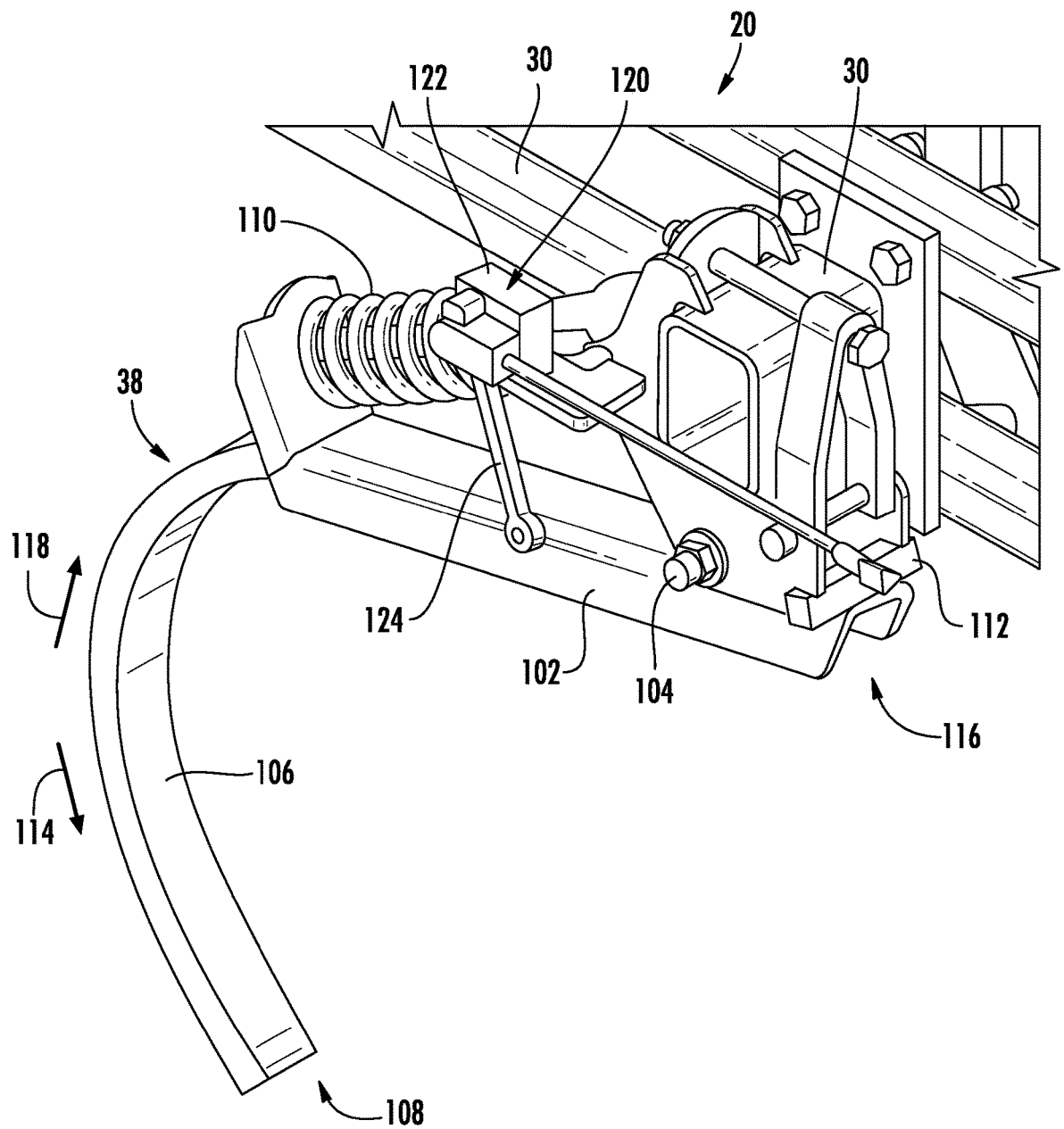
FIG. 3 illustrates a perspective view of one embodiment of a ground engaging tool assembly suitable for use within the agricultural implement shown in FIGS. 1 and 2 in accordance with aspects of the present subject matter, particularly illustrating a spring configured to bias an associated ground engaging tool relative to a frame of the implement.

Referring now to FIG. 3, a perspective view of one embodiment of a ground engaging tool assembly 100 is illustrated in accordance with aspects of the present subject matter. In general, the assembly 100 will be described herein with reference to the implement 10 described above with reference to FIGS. 1-2. However, it should be appreciated by those of ordinary skill in the art that the disclosed assembly 100 may generally be utilized with implements having any other suitable implement configuration, such as a disk harrow.

As shown in FIG. 3, the ground engaging tool assembly 100 may include one of the ground engaging tools 38 described above with reference to FIGS. 1 and 2. More specifically, the ground engaging tool 38 may generally include a shank portion 102 configured to be pivotally coupled to the frame 20 (e.g., at pivot joint 104) and a ground-engaging portion 106 extending from the shank portion 102 along a curved or arcuate profile. The ground-engaging portion 106 may include a tip end 108 that is configured to penetrate into or otherwise engage the ground as the implement 10 is being pulled through the field. In the illustrated embodiment, the ground engaging tool 38 may be configured as a chisel. However, one of ordinary skill in the art would appreciate that the ground engaging tool 38 may be configured as a sweep, tine, or any other suitable ground engaging tool.

The assembly 100 may also include a biasing element 110 coupled between the frame 20 and the ground engaging tool 38. In this respect, the biasing element 110 may be configured to bias the ground engaging tool 38 to a predetermined tool position (e.g., a home or base position) relative to the frame 20. In general, the predetermined tool position may correspond to a tool position in which the ground engaging tool 38 penetrates the soil or ground to a desired depth. In several embodiments, the predetermined ground engaging tool position may be set by a mechanical stop 112. In operation, the biasing element 110 may permit relative movement between the ground engaging tool 38 and the frame 20. For example, the biasing element 110 may be configured to bias the ground engaging tool 38 to pivot relative to the frame 20 in a first pivot direction (e.g., as indicated by arrow 114 in FIG. 3) until an end 116 of the shank portion 102 of the ground engaging tool 38 contacts the stop 112. The biasing element 110 may also allow the ground engaging tool 38 to pivot away from the predetermined tool position (e.g., to a shallower depth of penetration), such as in a second pivot direction (e.g., as indicated by arrow 118 in FIG. 3) opposite the first pivot direction 114, when encountering rocks or other impediments in the field. As shown in FIG. 3, the biasing element 110 may be configured as a spring. As will be discussed, however, the biasing element 110 may be configured as an actuator or any other suitable biasing element.

In accordance with aspects of the present subject matter, the assembly 100 may also include a sensor 120 provided in operative association with the ground engaging tool 38 or the biasing element 110. In general, the sensor 120 may be configured to detect an operating parameter indicative of a force exerted on the ground engaging tool 38 by the soil or ground. In several embodiments, the sensor 120 may generally correspond to any suitable sensor(s) or sensing device (s) that is configured to directly or indirectly detect a current position of the ground engaging tool 38 relative to the frame 20 or otherwise detect the pivotal motion of the ground engaging tool 38. For example, the sensor 120 may be configured as a rotary sensor 122 (e.g., a rotary potentiometer or a magnetic rotary sensor) coupled to one of the frame 20 or the ground engaging tool 38 and an associated sensor linkage 124 coupled between the rotary sensor 122 and the other adjacent component. For instance, as shown in the illustrated embodiment, the rotary sensor 122 is coupled to a portion of the frame 20, with the sensor linkage 124 being coupled between the rotary sensor 122 and the ground engaging tool 38. As such, when the ground engaging tool 38 pivots relative to the frame 20, the motion of the ground engaging tool 38 may be detected by the rotary sensor 122 via the mechanical linkage provided by the sensor linkage 124. The current position of the ground engaging tool 38 relative to the frame 20 may, in turn, be indicative of the force exerted on the ground engaging tool 38 by the soil or ground.

In other embodiments, the sensor 120 may correspond to any other suitable sensor(s) or sensing device(s) configured to detect the pivotal motion of the ground engaging tool 38. For instance, the sensor 120 may correspond to a linear potentiometer, a proximity sensor, and/or any other suitable transducer (e.g., ultrasonic, electromagnetic, infrared, etc.) that allows the pivotal motion of the ground engaging tool 38 relative to the frame 20 to be directly or indirectly detected, thereby providing an indication of the force exerted on the tool 38 by the soil or ground.

As indicated above, FIG. 3 simply illustrates a single ground engaging tool 38 of the implement 10, with the biasing element 110 being coupled between the frame 20 and the illustrated ground engaging tool 38 and the sensor 120 being provided to monitor the displacement or pivotal motion of such ground engaging tool 38. However, a person of ordinary skill in the art will appreciate that any or all of the remaining ground engaging tools 38 of the disclosed implement 10 may similarly be provided in operative association with a corresponding biasing element 110 and an associated sensor 120. For example, as will be described below with reference to FIG. 6, a biasing element 110 may be coupled to each of a plurality of ground engaging tools 38 of the implement 10, such as ground engaging tools 38A, 38B, 38C, 38D, 38E, 38F. Moreover, in such an embodiment, a corresponding sensor 120 may be provided in operative association with each ground engaging tool 38A, 38B, 38C, 38D, 38E, 38F and/or its associated biasing element 110.

Figure 4:
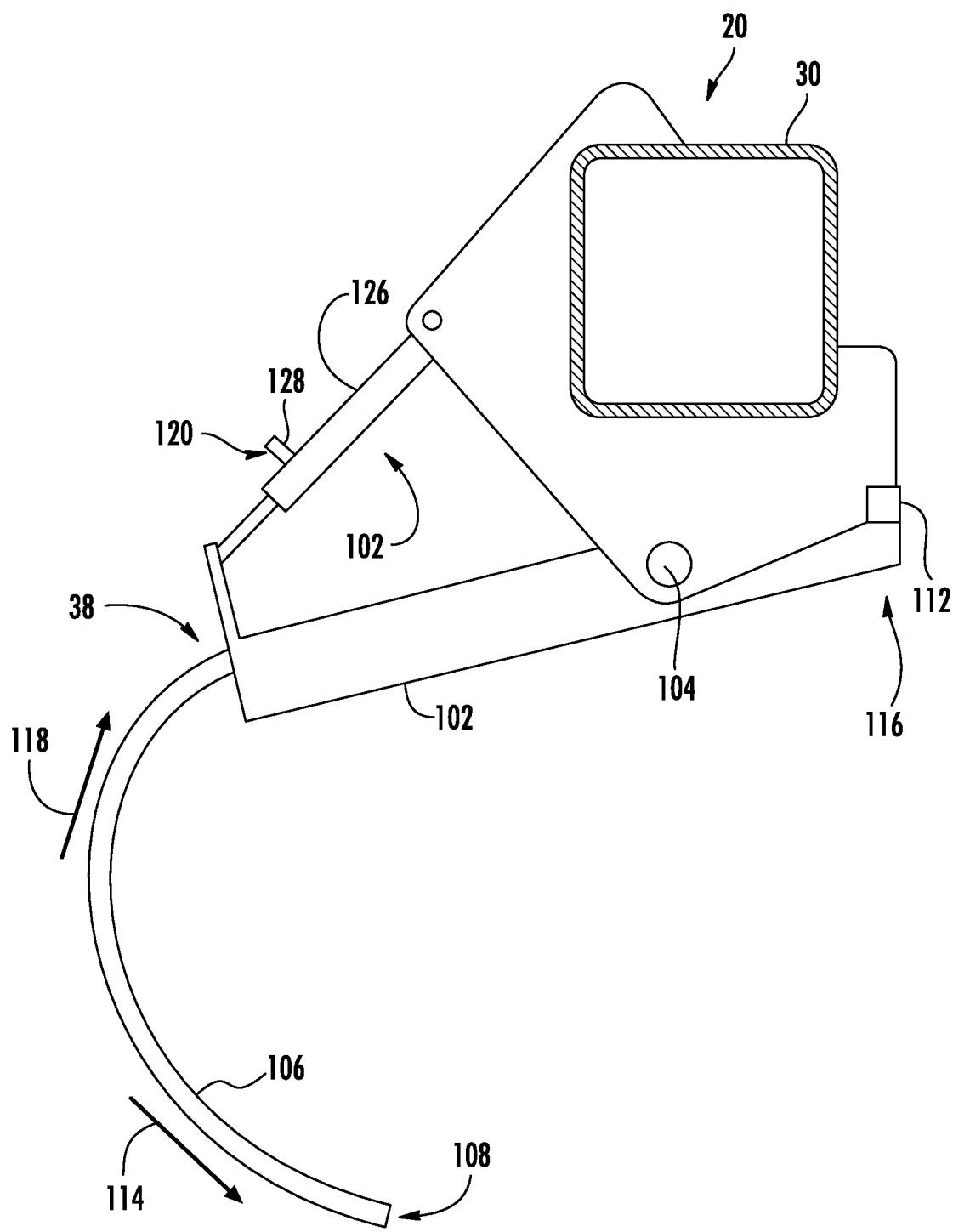
FIG. 4 illustrates a side view of another embodiment of a ground engaging tool assembly suitable for use within the agricultural implement shown in FIGS. 1 and 2 in accordance with aspects of the present subject matter, particularly illustrating a fluid-driven actuator configured to bias an associated ground engaging tool relative to a frame of the implement.

Referring now to FIG. 4, a side view of another embodiment of the ground engaging tool assembly 100 described above with reference to FIG. 3 is illustrated in accordance with aspects of the present subject matter. As shown, the assembly 100 may generally be configured the same as or similar to that described above with reference to FIG. 3. For instance, the assembly 100 may include a biasing element 110 coupled between the frame 20 and the ground engaging tool 38, with the biasing element 110 being configured to bias the ground engaging tool 38 to a predetermined tool position relative to the frame 20. However, as shown in FIG. 4, unlike the above-described embodiment, the biasing element 110 may be configured as a fluid-driven actuator 126, such as hydraulic actuator and/or a pneumatic actuator. Specifically, in one embodiment, the actuator 126 may be configured to adjust a down pressure exerted on the ground engaging tool 38 based on a fluid pressure supplied to or otherwise associated with the fluid-driven actuator 126. It should be appreciated that, in alternate embodiments, the biasing element 110 may be a solenoid-driven actuator, or any other suitable type of actuator.

Similar to the embodiment described above with reference to FIG. 3, the assembly 100 may include a sensor 120 configured to monitor an operating parameter indicative of a force exerted on the ground engaging tool 38 by the soil. However, as shown in FIG. 4, unlike the above-described embodiment, the sensor 120 may be configured as a pressure sensor 128 provided in operative association with the fluid-driven actuator 126. In general, the pressure sensor 128 may be configured to detect or measure a pressure of a fluid supplied to and/or within the actuator 126. For example, in one embodiment, the pressure sensor 128 may be provided in fluid communication with a fluid chamber defined within the actuator 126 (e.g., a piston-side chamber or a rod-side chamber of the actuator 126). Alternatively, the pressure sensor 128 may be installed at any other suitable location that allows the pressure sensor 128 to measure the pressure of the fluid supplied to and/or within the actuator 126, such as by installing the pressure sensor 128 in fluid communication with a hose or conduit configured to supply fluid to the actuator 126. The pressure of the fluid supplied within the actuator 126 may, in turn, be indicative of the force exerted on the ground engaging tool 38 by the soil or ground.

Figure 5:
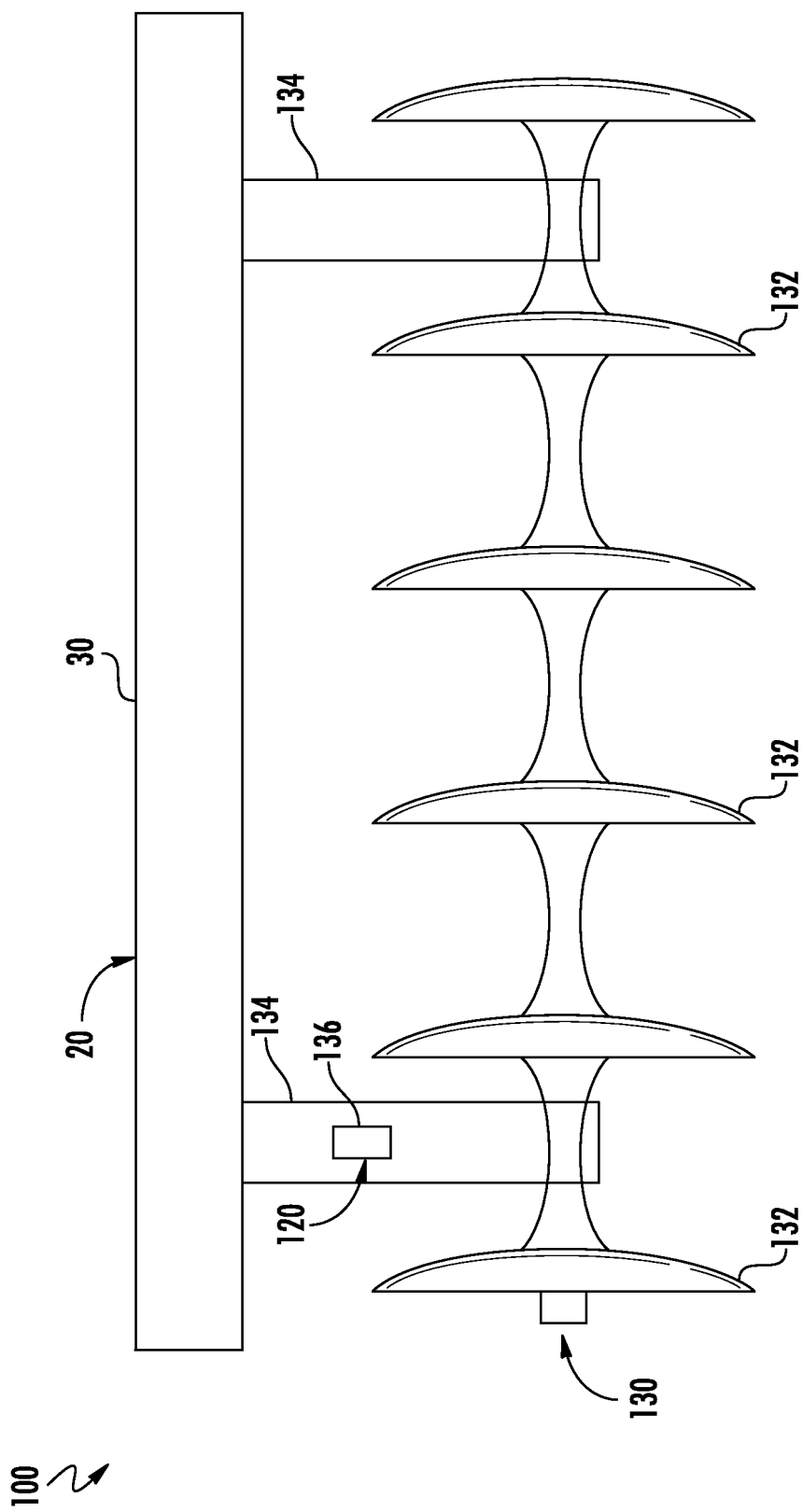
FIG. 5 illustrates a front view of a further embodiment of a ground engaging tool assembly suitable for use within the agricultural implement shown in FIGS. 1 and 2 in accordance with aspects of the present subject matter, particularly illustrating various components thereof.

Referring now to FIG. 5, a front view of a further embodiment of the ground engaging tool assembly 100 is illustrated in accordance with aspects of the present subject matter. In general, the assembly 100 will be described herein with reference to the implement 10 described above with reference to FIGS. 1-2. However, it should be appreciated by those of ordinary skill in the art that the disclosed assembly 100 may generally be utilized with implements having any other suitable implement configuration.

As shown in FIG. 5, the ground engaging tool assembly 100 may include a gang or set 130 of disk blades 132. More specifically, the gang 130 of disk blades 132 may be mounted to the implement frame 20 by two or more hangers 134. In such an embodiment, each disk blade 132 may, for example, include both a concave side (not shown) and a convex side (not shown). As such, the disk blades 132 may be configured to penetrate into or otherwise engage the ground as the implement 10 is being pulled through the field. In addition, the gang 130 of disk blades 132 may be oriented at an angle relative to the travel direction 14 to promote more effective tilling of the soil.

In accordance with aspects of the present subject matter, the assembly 100 may also include a sensor 120 configured to detect an operating parameter indicative of a force exerted on the gang 130 of disk blades 132 by the soil or ground. In several embodiments, the sensor 120 may generally correspond to any suitable sensor(s) or sensing device(s) that is configured to directly or indirectly detect the force exerted on the gang 130 of disk blades 132 by the soil. For example, the sensor 120 may be configured as a force sensor 136 (e.g., a load cell, strain gauge, or other suitable force transducer) coupled to one of the hangers 134. In other embodiments, the sensor 120 may correspond to any other suitable sensor (s) or sensing device(s) configured to detect the force exerted on the hang 130 of disk blades 132.

As indicated above, FIG. 5 simply illustrates a single gang 130 of disk blades 132, with the sensor 120 being provided to monitor the force exerted on such gang 130 of disk blades 132. However, a person of ordinary skill in the art will appreciate that any number of gangs 130 of disk blades 132 may similarly be provided in operative association with an associated sensor 120.

It should be appreciated that the configurations of the ground engaging tool assemblies 100 described above and shown in FIGS. 3-5 are provided only to place the present subject matter in an exemplary field of use. Thus, it should be appreciated that the present subject matter may be readily adaptable to any manner of ground engaging tool assembly configuration.

Figure 6:
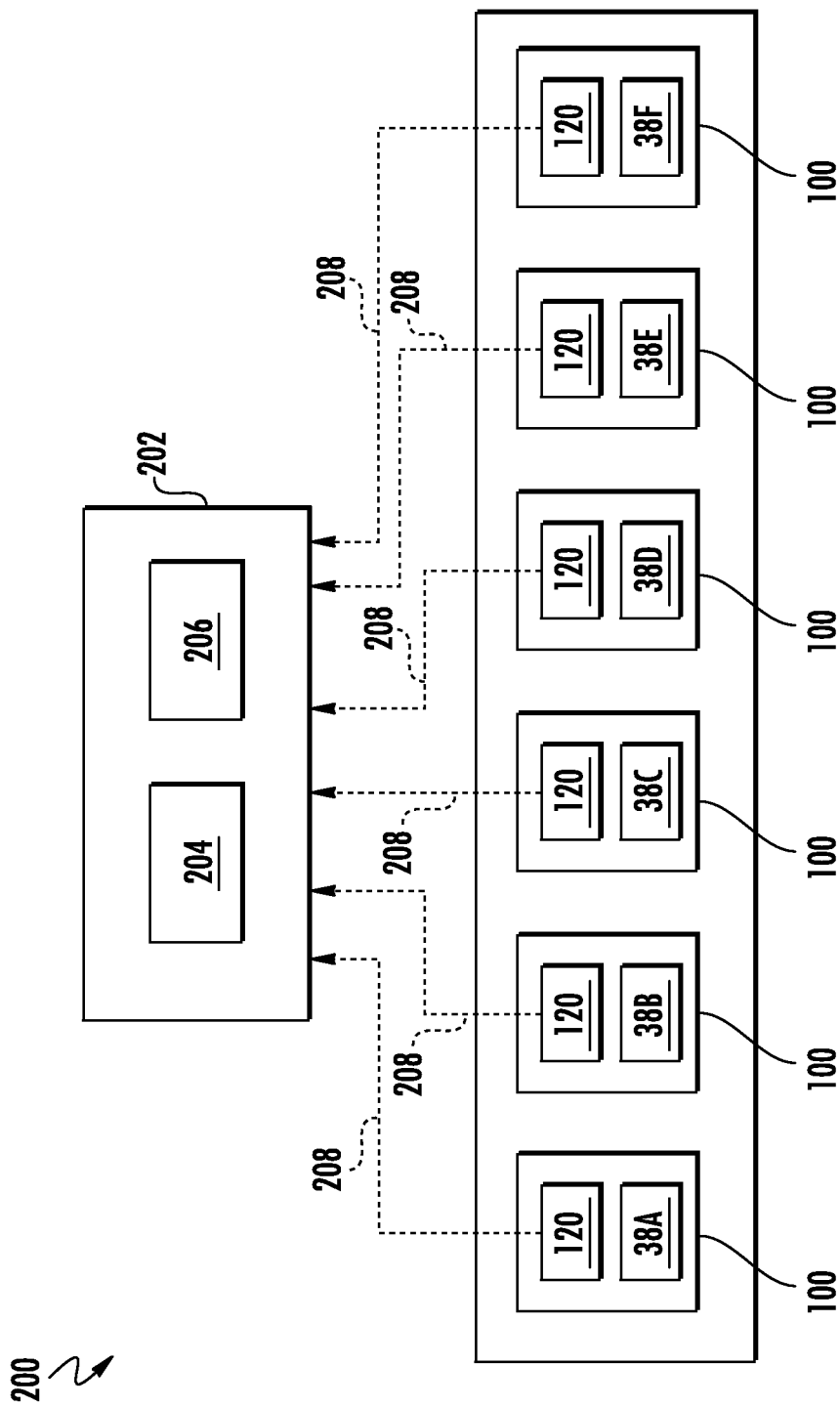
FIG. 6 illustrates a schematic view of one embodiment of a system for monitoring frame levelness of an agricultural implement in accordance with aspects of the present subject matter.

Referring now to FIG. 6, a schematic view of one embodiment of a system 200 for monitoring frame levelness of an agricultural implement is illustrated in accordance with aspects of the present subject matter. In general, the system 200 will be described herein with reference to the implement 10 and the ground engaging tool assemblies 100 described above with reference to FIGS. 1-5. However, it should be appreciated by those of ordinary skill in the art that the disclosed system 200 may generally be utilized with ground engaging tool assemblies having any other suitable tool assembly configuration and/or implements having any other suitable implement configuration.

As shown in FIG. 6, the system 200 may include a plurality of the ground engaging tool assemblies 100 coupled to the frame 20 of the implement 10. For example, in one embodiment, the system 200 may include the ground engaging tool assemblies 100 (including the associated sensors 120) corresponding to the ground engaging tools 38A, 38B, 38C, 38D, 38E, 38F. However, it should be appreciated by those of ordinary skill in the art that the system 200 may include the ground engaging tool assemblies 100 corresponding to any of the ground engaging tools 38. Additionally, it should be appreciated that, although the system 200 is generally described herein with reference to a specific set of ground engaging tools 38A, 38B, 38C, 38D, 38E, 38F, the system 200 may generally include ground engaging tool assemblies 100 provided in association with any suitable ground engaging tool(s), including any of the other ground engaging tools shown and described above, such as the ground engaging elements 50 associated with the harrows 48, the rotary firming wheels 52, the gangs 130 of disk blades 132, and/or any other ground engaging tools to be coupled to an implement frame 20.

Furthermore, the system 200 may also include a controller 202 configured to electronically control the operation of one or more components of the implement 10 or the work vehicle 12. In general, the controller 202 may comprise any suitable processor-based device known in the art, such as a computing device or any suitable combination of computing devices. Thus, in several embodiments, the controller 202 may include one or more processor(s) 204 and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 206 of the controller 202 may generally comprise memory element(s) including, but not limited to, a computer readable medium (e.g., random access memory (RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the method 300 described below with reference to FIG. 10. In addition, the controller 202 may also include various other suitable components, such as a communications circuit or module, one or more input/output channels, a data/control bus and/or the like.

It should be appreciated that the controller 202 may correspond to an existing controller of the implement 10 or the work vehicle 12 or the controller 202 may correspond to a separate processing device. For instance, in one embodiment, the controller 202 may form all or part of a separate plug-in module that may be installed within the implement 10 or the work vehicle 12 to allow for the disclosed system and method to be implemented without requiring additional software to be uploaded onto existing control devices of the implement 10 or the work vehicle 12.

In several embodiments, the controller 202 may be configured to monitor one or more parameters indicative of the forces exerted on at least two of the ground engaging tools 38A, 38B, 38C, 38D, 38E, 38F by the ground and determine a parameter differential existing between the monitored parameters. Specifically, the controller 202 may be communicatively coupled to the various sensors 120 provided in operative association with the ground engaging tools 38A, 38B, 38C, 38D, 38E, 38F via a wired or wireless connection to allow measurement signals (e.g., indicated by dashed lines 208 in FIG. 6) to be transmitted from the sensors 120 to the controller 202. As such, the controller 202 may be configured to determine or estimate a current parameter value for at least two of the ground engaging tools 38A, 38B, 38C, 38D, 38E, 38F based on the measurement signals 208 received from the associated sensors 120, such as by determining a current value of the relative position of such tools to the implement frame 20, a current value of the operating pressure associated with a biasing element coupled to the tools and/or a current value of the force exerted on the tools by the soil or ground. For instance, the controller 202 may include a look-up table or suitable mathematical formula stored within its memory 206 that correlates the sensor measurements to the current parameter values of the ground engaging tools 38A, 38B, 38C, 38D, 38E, 38F. The controller 202 may then be configured to compare the current parameter value of one of the ground engaging tools 38A, 38B, 38C, 38D, 38E, 38F and the current parameter value of another of the ground engaging tools 38A, 38B, 38C, 38D, 38E, 38F to determine the parameter differential that exists between those two ground engaging tools 38A, 38B, 38C, 38D, 38E, 38F.

As indicated above, it should be appreciated that specific parameters monitored by the controller 202 may generally correspond to any suitable parameter(s) that provides an indication of the forces exerted on the ground engaging tools 38A, 38B, 38C, 38D, 38E, 38F by the soil or ground. For example, as described above with reference to FIG. 3, in one embodiment, the monitored parameter may correspond to a current position of each ground engaging tool 38A, 38B, 38C, 38D, 38E, 38F relative to its associated predetermined tool position. In such instance, any forces exerted on the ground engaging tools 38A, 38B, 38C, 38D, 38E, 38F by the soil may cause the ground engaging tools 38A, 38B, 38C, 38D, 38E, 38F to move away from their associated predetermined tool positions. Similarly, as described above with reference to FIG. 4, in another embodiment, the monitored parameter may correspond to the current fluid pressure(s) associated with corresponding actuators 126 coupled to the ground engaging tools 38A, 38B, 38C, 38D, 38E, 38F. In such instance, any forces exerted on the ground engaging tools 38A, 38B, 38C, 38D, 38E, 38F by the soil may result in a change in the associated fluid pressures, such as an increase in the monitored fluid pressure. Additionally, in a further embodiment, the monitored parameter(s) may correspond to any other direct or indirect measurements of the actual forces exerted on the ground engaging tools 38A, 38B, 38C, 38D, 38E, 38F by the soil or ground.

As indicated above, the ground engaging tools 38A, 38B, 38C, 38D, 38E, 38F may be laterally spaced apart from each other across the implement 10. In such instances, a differential in the monitored parameter between two or more of the ground engaging tools 38A, 38B, 38C, 38D, 38E, 38F may be indicative of roll or rolling of the implement frame 20 in the lateral direction 25 of the implement 10 (e.g., the frame 20 has rolled in one direction or the other laterally such that the first and second sides 26, 28 of the frame 20 are at different heights relative to the ground). For example, in certain instances, if the parameter differential between two or more of the laterally spaced apart ground engaging tools 38A, 38B, 38C, 38D, 38E, 38F is too great, the frame 20 of the implement 10 may be rolled or angled relative to the ground such that the penetration depths of the laterally spaced ground-engaging tools 38A, 38B, 38C, 38D, 38E, 38F varies undesirably. Accordingly, in several embodiments, the controller 202 may be configured to compare the parameter differential determined to exist between two or more of the laterally spaced ground engaging tools 38A, 38B, 38C, 38D, 38E, 38F to a predetermined maximum parameter differential threshold set for the implement 10. In such embodiments, the maximum parameter differential threshold may correspond to a parameter differential between two or more laterally spaced ground engaging tools 38A, 38B, 38C, 38D, 38E, 38F that, when exceeded, is indicative of an undesirable amount of roll or rolling of the frame 20, thereby indicating that the levelness or orientation of the implement frame 20 may need to be adjusted or corrected across the lateral direction 25 of the implement 10.

Additionally, as indicated above, some of the ground engaging tools 38A, 38B, 38C, 38D, 38E, 38F may be longitudinally spaced apart from other of the ground engaging tools 38A, 38B, 38C, 38D, 38E, 38F across the implement 10. In one embodiment, the controller 202 may be configured to compare the parameter differential that currently exists between two or more of the longitudinally spaced ground engaging tools 38A, 38B, 38C, 38D, 38E, 38F to a desired parameter differential range. Specifically, in certain instances, the soil may exert greater forces on the ground engaging tools 38 positioned at or proximate to the forward end 22 of the frame 20 than on the ground engaging tools 38 positioned at or proximate to the aft end 24 of the frame 20. As a result, a predetermined parameter differential range may be defined that encompasses the typical parameter differential that exists between two or more of the longitudinally spaced ground engaging tools 38A, 38B, 38C, 38D, 38E, 38F when the implement frame 20 is considered to be level or otherwise desirably oriented relative to the ground. In such instances, when the monitored parameter differential between two or more of the longitudinally spaced ground engaging tools 38A, 38B, 38C, 38D, 38E, 38F falls outside of the predetermined differential range, the controller may determine that the implement frame 20 has experienced a given amount of pitching or pitch in the longitudinal direction 23 of the implement 10 (e.g., the frame has pitched in one direction or the other longitudinally such that the forward and aft sides 22, 24 of the frame 20 are at different heights relative to the ground). For example, if the monitored parameter differential between at least two of the longitudinally spaced ground engaging tools 38A, 38B, 38C, 38D, 38E, 38F is too small or too large (and, thus, falls outside the predetermined differential range), the frame 20 of the implement 10 may be pitched or angled relative to the ground in the longitudinal direction 25 such that the penetration depths of the apart ground-engaging tools 38 varies undesirably. Accordingly, in several embodiments, the controller 202 may be configured to compare the parameter differential determined to exist between at least two of the longitudinally spaced ground engaging tools 38A, 38B, 38C, 38D, 38E, 38F to the predetermined parameter differential range set for the implement 10. As indicated above, in such embodiments, the minimum and maximum thresholds set for the predetermined differential range may correspond to parameter differential values between two or more of the longitudinally spaced ground engaging tools 38A, 38B, 38C, 38D, 38E, 38F encompassing a range of values indicative of a desired orientation or frame levelness for the implement 10 in the longitudinal direction 25. As such, when the monitored parameter differential between at least two of the longitudinally spaced ground engaging tools 38A, 38B, 38C, 38D, 38E, 38F exceeds or falls below the maximum and minimum values, respectively, set for the range, the controller 200 may determine that the orientation of the frame 20 needs to be adjusted to reorient the frame 20 back to the desired levelness.

It should be appreciated that a maximum and/or minimum parameter differential threshold may be set for any pair of laterally and/or longitudinally spaced ground engaging tools 38, 38A, 38B, 38C, 38D, 38E, 38F or ground engaging tool assemblies 100. Furthermore, in one embodiment, the controller may be configured to identify various ratios or patterns between the monitored parameters for two or more of the ground engaging tools 38A, 38B, 38C, 38D, 38E, 38F in addition to or in lieu of comparing the parameter differential to the minimum and/or maximum parameter differential thresholds.

Moreover, in one embodiment, the controller 202 may be configured identify a time period across which the monitored parameter differential exceeds the maximum parameter differential threshold or falls below the minimum parameter differential threshold set for the implement. In such instance, the controller 202 may compare the identified time period that the monitored parameter differential exceeds the maximum parameter differential threshold or falls below the minimum parameter differential threshold to a threshold time period. When the identified time period exceeds the threshold time period, the controller 202 may be configured to determine that the implement frame 20 has rolled and/or pitched to that extent that the levelness of the frame 20 needs to be adjusted in one or both of the longitudinal direction or lateral direction of the implement 10.

Figure 7:
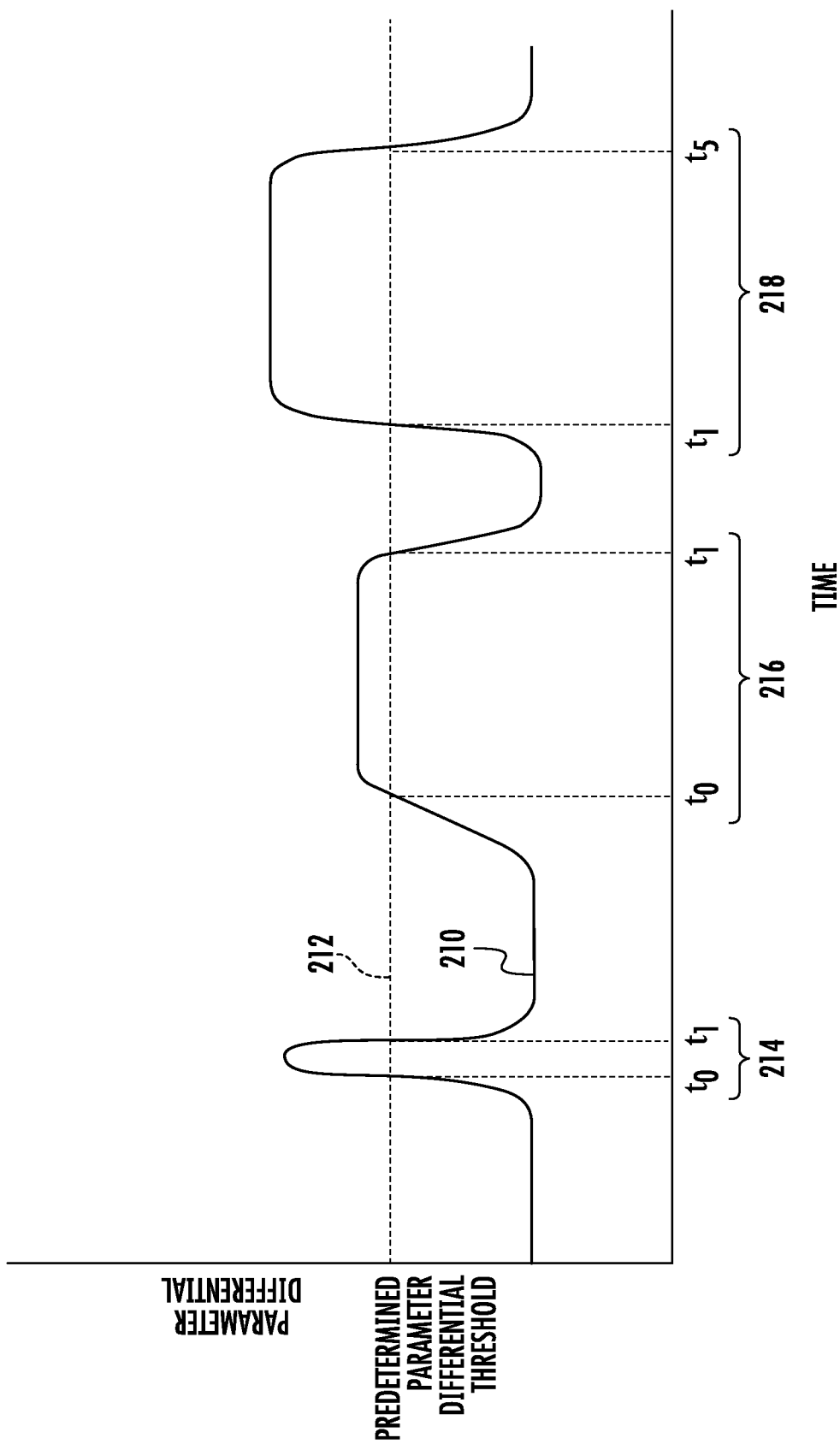
FIG. 7 illustrates a graphical view of an example dataset charting a parameter differential between at least two ground engaging tools of an agricultural implement relative a predetermined parameter differential threshold over time in accordance with aspects of the present subject matter.

For instance, FIG. 7 illustrates a graphical view of an example dataset charting the parameter differential between two of the ground engaging tools 38A, 38B, 38C, 38D, 38E, 38F of the implement 10 (e.g., as indicated by solid line 210) relative the predetermined maximum parameter differential (e.g., as indicated by dashed line 212) over time as monitored by the controller 202. As shown in FIG. 7, during various different time periods, the parameter differential 210 exceeds a maximum parameter differential threshold 212 set for the implement 10, such as at a first time period 214 between time $t_0$ and time $t_1$, a second time period 216 between time $t_2$ and time $t_3$, and a third time period 218 between time $t_4$ and $t_5$. In such instances, the controller 202 may be configured to identify the length of each time period and compare it to a given threshold time period. In the event that the length of any of such time periods exceeds the threshold time period, the controller 202 may determine that the implement frame 20 has actually rolled and/or pitched to an undesirable extent as opposed to the increase in the parameter differential being caused by a temporary or instantaneous event. For instance, in the example dataset of FIG. 7, it may be assumed that the first time period 214 is less than the threshold time period while the second and third time periods 216, 218 exceed the threshold time period. In such instance, the parameter differential occurring across the first time period 214 may be indicative of a momentary change in the monitored parameter for one or more the ground engaging tools, such as when the implement 10 traverses a sudden change in geography or when one of the ground engaging tools passes over or hits a rock or hole in the ground. In contrast, the parameter differential occurring across second and third time periods 216, 218 may be indicative of more prolonged change in the monitored parameter differential, thereby indicating the detected change is more than likely not occurring due to a temporary or instantaneous event, but, rather, due to a change in the orientation or levelness of the frame 20 caused by pitching and/or rolling.

It should be appreciated that the time period threshold utilized by the controller 202 may generally be selected so as to prevent instantaneous or significantly short changes in the monitored parameter differential triggering an indication that the frame 20 has rolled and/or pitched to an undesired extent. For instance, in one embodiment, the time period threshold may be greater than about 0.1 seconds, such as greater than about 0.5 seconds or greater than about 1 second or greater than about 2 seconds.

In accordance with aspects of the present subject matter, when the parameter differential determined by the controller 202 exceeds or falls below the predetermined parameter differential threshold set for the implement 10, the controller 202 may be configured initiate a control action associated with adjusting the pitch and/or the roll of the frame 20, thereby correcting the levelness of the implement frame 20. For instance, in one embodiment, the controller 202 may be configured to transmit a notification to the operator of the implement 10 (e.g., by causing a visual or audible notification or indicator to be presented to the operator within the work vehicle 12) that provides an indication that the parameter differential between at least two of the ground engaging tools 38A, 38B, 38C, 38D, 38E, 38F exceeds or falls below the parameter differential threshold, such as by providing a notification that the frame 20 is not level in the longitudinal direction 23 and/or the lateral direction 25 due to pitching and/or rolling of the frame 20. In such instances, the operator may then choose to initiate any suitable corrective action he/she believes is necessary, such as by manually adjusting the position of the wheels 32 relative to the frame 20 or by manually controlling the operation of one or more components of the implement 10 in a manner designed to reorient the frame 20 relative to the ground. Additionally, in one embodiment, the controller 202 may be configured to generate a field map that visually identifies the levelness of the field across each portion of the field traversed by the implement 10 based on the parameter differential between at least two of the ground engaging tools 38A, 38B, 38C, 38D, 38E, 38F. Alternatively, as will be described below with reference to FIGS. 8 and 9, the controller 202 may be configured to automatically control the operation of one or more components of the implement 10 in a manner designed to adjust the pitch and/or the roll of the frame 20.

Figure 8:
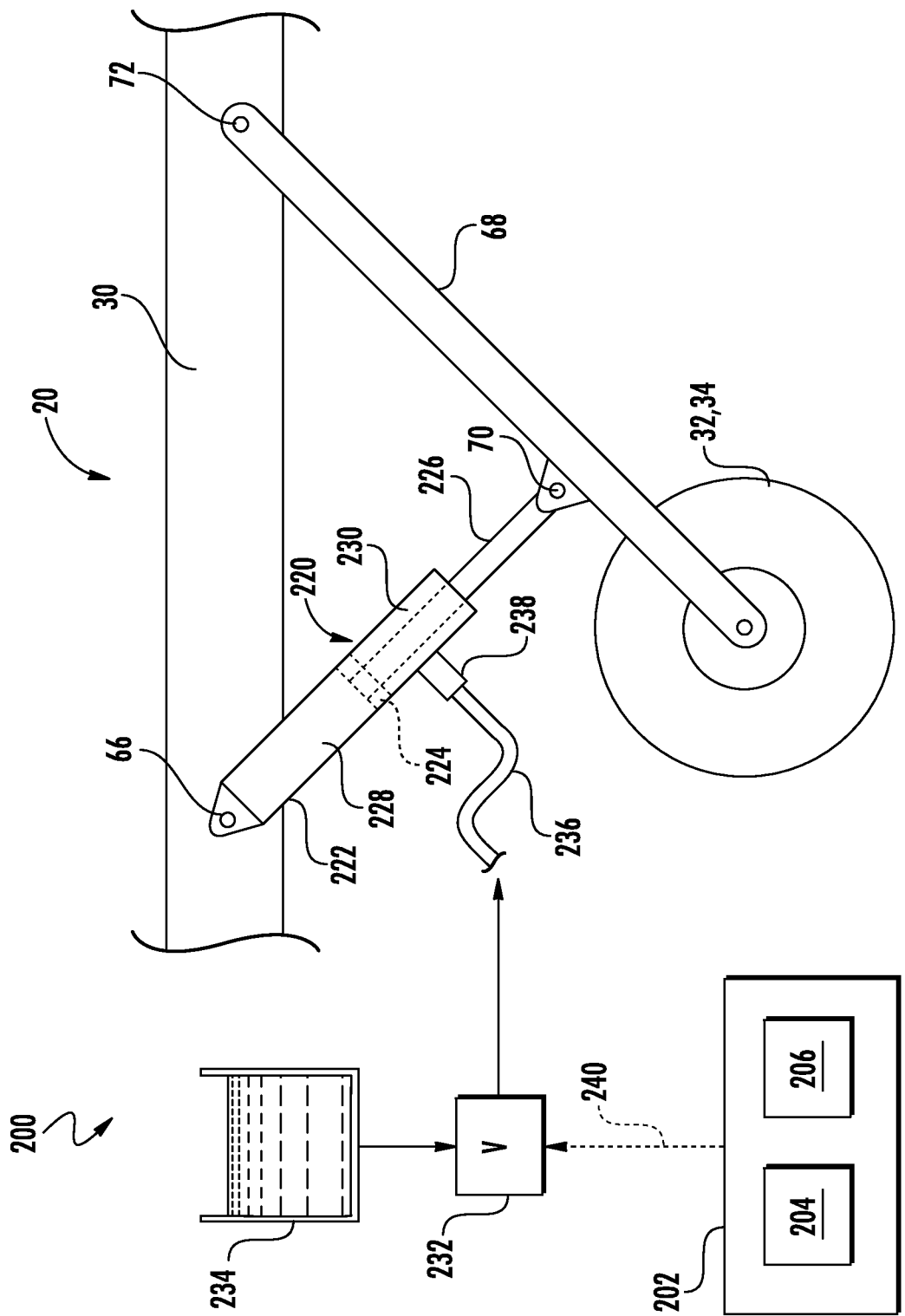
FIG. 8 illustrates a side view of another embodiment of a system for monitoring frame levelness of an agricultural implement in accordance with aspects of the present subject matter, particularly illustrating the system including an actuator for adjusting a position of a wheel relative to the implement's frame.
Figure 9:
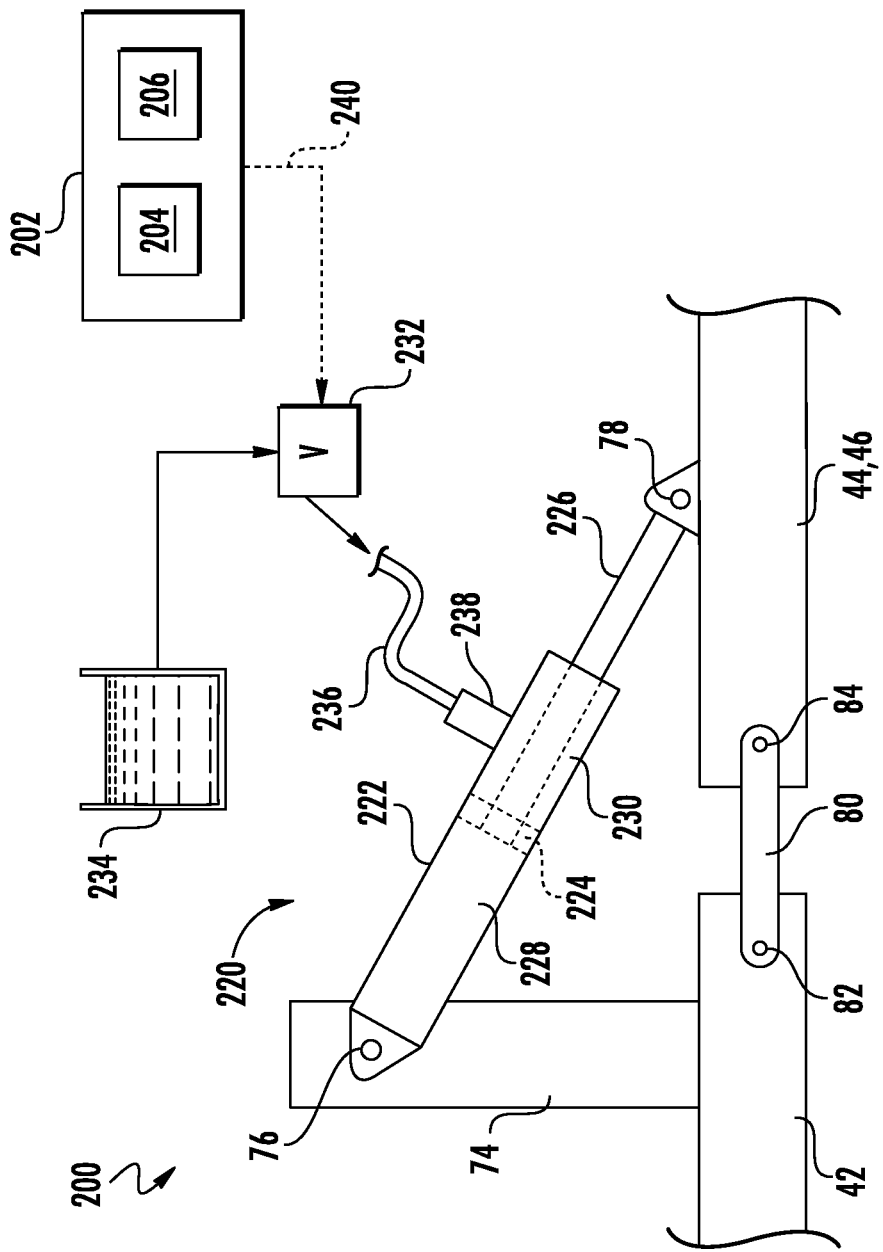
FIG. 9 a side view of a further embodiment of a system for monitoring frame levelness of an agricultural implement in accordance with aspects of the present subject matter, particularly illustrating the system including an actuator for adjusting a position of a wing section of the implement's frame relative to an main section of the implement's frame.
Figure 10:
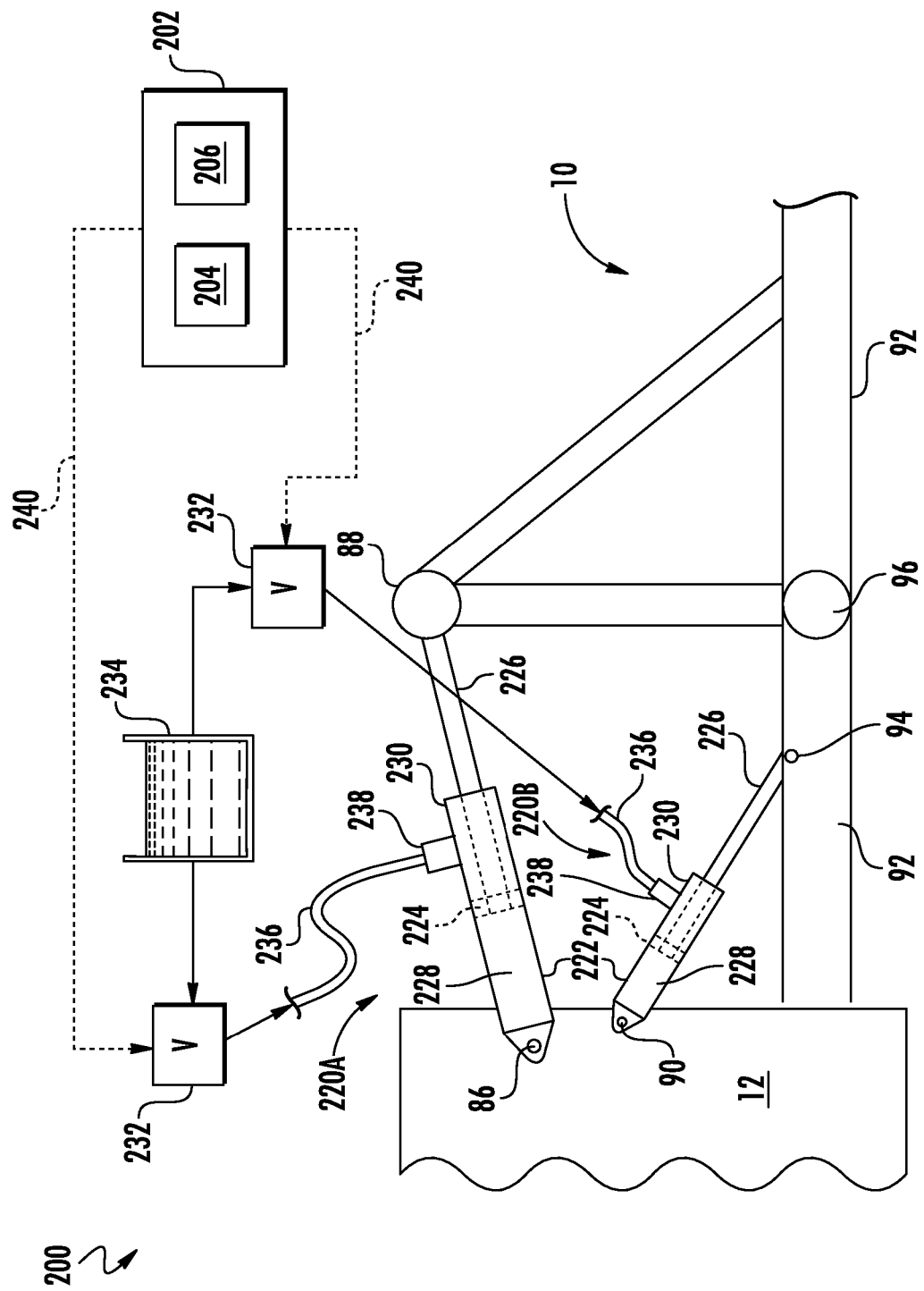
FIG. 10 illustrates a side view of yet another embodiment of a system for monitoring frame levelness of an agricultural implement in accordance with aspects of the present subject matter, particularly illustrating the system including an actuator for adjusting a position of a pull hitch of the implement relative to an associated work vehicle.

FIGS. 8-10 illustrate side views of various implementations of the system 200 described above with reference to FIG. 6 in accordance with aspects of the present subject matter. Specifically, the embodiments shown in FIGS. 8-10 illustrate example configurations that may be used for adjusting the relative positioning of one or more components of the implement 10 and or the work vehicle 12 so as to allow the pitch and/or the roll of the frame 20 to be adjusted when it is determined that an undesirable parameter differential exists between two or more of the ground engaging tools 38A, 38B, 38C, 38D, 38E, 38F of the implement 10. For example, FIG. 8 illustrates a side view of an actuator 220 configured for adjusting a position of one of the wheels 32, 34 of the implement 10 relative to the frame 20 of the implement 10. Similarly, FIG. 9 illustrates a side view of an actuator 220 configured for adjusting a position of one of the wing sections 44, 46 of the frame 20 relative to the main frame section 42 of the frame 20. Additionally, FIG. 10 illustrates a side view of an actuator 220 configured for adjusting a position of the pull hitch 18 of the implement 10 relative to the work vehicle 12. It should be appreciated that, in the illustrated embodiments of FIGS. 8 and 9, the actuator 220 corresponds to a hydraulic cylinder. However, it should be appreciated that the actuator 220 may also correspond to any other suitable actuator, such as a pneumatic actuator, linear actuator, or a solenoid.

Referring particularly now to FIG. 8, in several embodiments, the wheels 32, 34 may be configured to be pivotable or otherwise moveable relative to the frame 20 of the implement 10 so as to permit one or more associated actuators 220 to adjust the position of the wheels 32, 34 relative to the frame 20. In such embodiments, when the parameter differential between two laterally spaced apart ground engaging tools 38A, 38B, 38C, 38D, 38E, 38F exceeds or falls below the associated parameter differential, the position of the wheels 32, 34 relative to the frame 20 may be adjusted so as to adjust the orientation the frame 20 in the lateral direction 25.

As shown in FIG. 8, in one embodiment, one end of the actuator 220 may be pivotably coupled to one of the frame members 30 of the frame 20 at a pivot joint 66. Similarly, an opposed end of the actuator 220 may also be coupled to a pivot arm 68 of the implement 10 at a pivot joint 70. As shown, the pivot arm 68 may, in turn, pivotably couple the wheel 32, 34 to the corresponding frame member 30 of the frame 20 at a pivot joint 72. As such, the pivot joints 66, 70, 72 may allow relative pivotable movement between the frame member 30, the pivot arm 68, and the actuator 220, thereby allowing the position of the associated wheel 32, 34 relative to the frame 20 to be adjusted. However, a person of ordinary skill in the art would appreciate that the wheels 32, 34 may be adjustably coupled to the frame 20 in any suitable manner that permits the actuator 220 to move the wheels 32, 34 relative to the frame 20. Furthermore, the actuator 220 may be configured to move any of the wheels 32, 34 on the implement 10 relative to the frame 20.

As indicated above, the actuator 220 may correspond to a suitable hydraulic actuator. Thus, in several embodiments, the actuator 220 may include both a cylinder 222 configured to house a piston 224 and a rod 226 coupled to the piston 224 that extends outwardly from the cylinder 222. Additionally, the actuator 220 may include a piston-side chamber 228 and a rod-side chamber 230 defined within the cylinder 222. As is generally understood, by regulating the pressure of the fluid supplied to one or both of the cylinder chambers 228, 230, the actuation of the rod 226 may be controlled. As shown in FIG. 8, in the illustrated embodiment, the end of the rod 226 is coupled to the arm 68 at the pivot joint 70, while the cylinder 222 is coupled to the frame member 30 at the opposed pivot joint 66. However, in an alternative embodiment, the end of the rod 226 may be coupled to the frame member 30 at pivot joint 66 while the cylinder 222 may be coupled to the arm 68 at the pivot joint 70.

In several embodiments, the system 200 may also include a suitable pressure regulating valve 232 (PRV) (e.g., a solenoid-activated valve or a manually operated valve) configured to regulate a supply of fluid (e.g., hydraulic fluid or air from a suitable fluid source or tank 234) being supplied to the actuator 220. As shown in FIG. 8, in one embodiment, the PRV 232 may be in fluid communication with the rod-side chamber 230 of the actuator 220. In this respect, the system 200 may include a fluid conduit 236, such as the illustrated hose, that fluidly couples the PRV 232 to a fitting 238 on the cylinder 222. As such, the PRV 232 may regulate the supply fluid to the rod-side chamber 230. It should be appreciated that, in alternate embodiments, the PRV 232 may be in fluid communication with the piston-side chamber 228 to regulate the supply fluid thereto. Alternatively, the system 200 may include a pair of PRVs 232, with each PRV 232 being in fluid communication with one of the chambers 228, 230 of the actuator 220.

Utilizing the system configuration shown in FIG. 8, the controller 202 may be configured to automatically control the operation of the actuator 220 so as to adjust the position of the wheels 32, 34 relative to the frame 20. Specifically, as indicated above, the controller 202 may be configured to detect the occurrence a parameter differential between two or more of the ground engaging tools 38A, 38B, 38C, 38D, 38E, 38F that exceeds or falls below an associated predetermined parameter differential threshold. In such instance, the controller 202 may be configured to electronically control operation of the PRV 232 to adjust the fluid pressure supplied within the actuator 220. For instance, the controller 202 may be configured to control the operation of the PRV 232 (e.g., via controls signals indicated by dashed line 240 in FIG. 8) such that the fluid pressure supplied to the rod-side chamber 230 of the actuator 220 is increased or decreased when it is detected that the parameter differential exceeds or falls below the associated parameter differential threshold. Increasing the fluid pressure within the rod-side chamber 230 may cause the rod 226 to retract into the cylinder 222, thereby moving the wheel 32, 34 closer to the frame 20. Conversely, decreasing the fluid pressure within the rod-side chamber 230 may cause the rod 226 to extend further from the cylinder 222, thereby moving the wheel 32, 34 farther away to the frame 20. Pivoting the wheel 32,34 upward relative to the frame 20 (e.g., if a portion of the frame 20 proximate to that wheel 32, 34 is farther from the ground than the portion of the frame 20 proximate to another of wheels 32, 34) or pivoting the wheels 32, 34 downward relative to the frame 20 (e.g., if a portion of the frame 20 proximate to that wheel 32, 34 is closer from the ground than the portion of the frame 20 proximate to another wheels 32, 34) may, for example, allow for a corresponding reduction in the roll of the frame 20.

Referring now to FIG. 9, as indicated above, the wing sections 44, 46 of the frame 20 may be configured to be pivotable relative to the main frame section 42 of the frame 20. As such, one or more actuators 220 may be used to adjust the position of the first and/or second wing sections 44, 46 relative to the main frame section 42, which may be desirable instances in which the frame 20 is rolled. In such embodiments, when the parameter differential between two laterally spaced apart ground engaging tools 38A, 38B, 38C, 38D, 38E, 38F exceeds or falls below the associated parameter differential, the position of first and/or second wing sections 44, 46 relative to the main frame section 42 may be adjusted so as to reduce the roll of the frame 20.

As shown in FIG. 9, to allow for such adjustments, the system 200 may include one or more actuators 220 coupled between each wing section 44, 46 and the main frame section 42 of the frame 20. In general, the actuator(s) 220 described with reference to FIG. 9 may be configured the same as or similar to the actuator 220 described above with reference to FIG. 8. Specifically, in several embodiments, the cylinder 222 of the actuator 220 may be pivotably coupled to a post 74 extending from the main frame section 42 of the frame 20 at pivot joint 76. Similarly, the rod 226 of the actuator 220 may pivotably coupled to the corresponding wing section 44, 46 at a pivot joint 78. Additionally, in one embodiment, a link 80 of the implement 10 may be pivotably coupled between the corresponding wing section 44, 46 and the main frame section4 at pivot joints 82, 84, respectively. As such, the pivot joints 76, 78, 82, 84 may allow relative pivotable movement between the main frame section 42, the corresponding wing section 44, 46, and the actuator 220. However, in alternative embodiments, the cylinder 222 of the actuator 220 may be pivotably coupled to the corresponding wing section 44, 46 at the pivot joint 78, while the rod 226 of the actuator 220 may pivotably coupled to the post 74 at the pivot joint 76.

Utilizing the system configuration shown in FIG. 9, the controller 202 may be configured to automatically control the operation of the actuator 220 so as to adjust the position of the wing section 44, 46 of the frame 20 relative to the main frame section 42. In this regard, the operation of the actuator 220 shown in FIG. 9 may be the same as or similar to the operation of the actuator 220 described above with reference to FIG. 8. As such, increasing the fluid pressure within the rod-side chamber 230 may retract the rod 226 into the cylinder 222, thereby pivoting the wing section 44, 46 upward (i.e., away the ground) relative to the main frame section 42. Conversely, decreasing the fluid pressure within the rod-side chamber 230 may extend the rod 226 farther outward from the cylinder 222, thereby pivoting the wing section 44, 46 downward (i.e., toward the ground) relative to the main frame section 42. Pivoting the wing section 44, 46 upward relative to the main frame section 42 (e.g., if the wing section 44, 46 is closer to the ground than the main frame section 42) or pivoting the wing section 44, 46 upward relative to the main frame section 42 (e.g., if the wing section 44, 46 is farther from the ground than the main frame section 42) may, for example, allow for a corresponding reduction in the roll of the frame 20, thereby reorienting the frame 20 across the lateral direction 25 of the implement 20.

Referring now to FIG. 10, as indicated above, the pull hitch 18 of the implement 10 may be configured to be pivotable relative to the work vehicle 12. As such, one or more actuators 220 may be used to adjust the position of the pull hitch 18 relative to the work vehicle 12, which may be desirable in instances in which the frame 20 is pitched. In such embodiments, when the parameter differential between two longitudinally spaced apart ground engaging tools 38A, 38B, 38C, 38D, 38E, 38F exceeds or falls below the associated parameter differential, the position of the pull hitch assembly relative to the work vehicle 12 may be adjusted so as to adjust the orientation of the frame 20 in the longitudinal direction 23.

As shown in FIG. 10, to allow for such adjustments, the system 200 may include one or more actuators, such as actuators 220A, 220B, coupled between the pull hitch 18 and the work vehicle 12. In general, the actuators 220A, 220B described with reference to FIG. 10 may be configured the same as or similar to the actuators 220 described above with reference to FIGS. 8 and 9. Specifically, in several embodiments, the cylinder 222 of the actuator 220A may be pivotably coupled to work vehicle 12 at pivot joint 86. Similarly, the rod 226 of the actuator 220A may be pivotably coupled to the pull hitch 18 at a pivot joint 88. Furthermore, the cylinder 222 of the actuator 220B may be pivotably coupled to work vehicle 12 at pivot joint 90. Similarly, the rod 226 of the actuator 220B may be pivotably coupled to a hitch link 92 of the work vehicle 12 at a pivot joint 94. Additionally, the hitch link 92 may be pivotably coupled to the pull hitch 18 at pivot joint 96. As such, the pivot joints 86, 88, 90, 94, 96 may allow relative pivotable movement between the pull hitch 18, the work vehicle 12, and the actuator 220A, 220B. However, in alternative embodiments, the cylinder 222 of the actuator 220A may be pivotably coupled to the pull hitch 18 at the pivot joint 88, while the rod 226 of the actuator 220A may pivotably coupled to the work vehicle 12 at the pivot joint 86. Furthermore, the cylinder 222 of the actuator 220B may be pivotably coupled to the hitch link 92 at the pivot joint 94, while the rod 226 of the actuator 220B may pivotably coupled to the work vehicle 12 at the pivot joint 90.

Utilizing the system configuration shown in FIG. 10, the controller 202 may be configured to automatically control the operation of the actuators 220A, 220B so as to adjust the position of the pull hitch 18 relative to the work vehicle 12. In this regard, the operation of the actuators 220A, 220B shown in FIG. 10 may be the same as or similar to the operation of the actuators 220 described above with reference to FIGS. 8 and 9. As such, increasing the fluid pressure within either or both of the rod-side chambers 230 may retract the associated rods 226 into the associated cylinder 222, thereby pivoting the pull hitch 18 upward (i.e., away the ground) relative to the frame 20. Conversely, decreasing the fluid pressure within either or both of the rod-side chambers 230 may extend the associated rods 226 farther outward from the associated cylinders 222, thereby pivoting the pull hitch 18 downward (i.e., toward the ground) relative to the work vehicle 12. Pivoting the pull hitch 18 upward relative to the work vehicle 12 (e.g., if the aft end 24 of the frame 20 is farther from the ground than the forward end 22 of the frame 20) or pivoting the hitch assembly 18 downward relative to the work vehicle 12 (e.g., if the forward end 22 of the frame 20 is farther from the ground than the aft end 24 of the frame 20) may, for example, allow for a corresponding reduction in the pitch of the frame 20, thereby reorienting the frame 20 across the longitudinal direction 25 of the implement 10.

Figure 11:
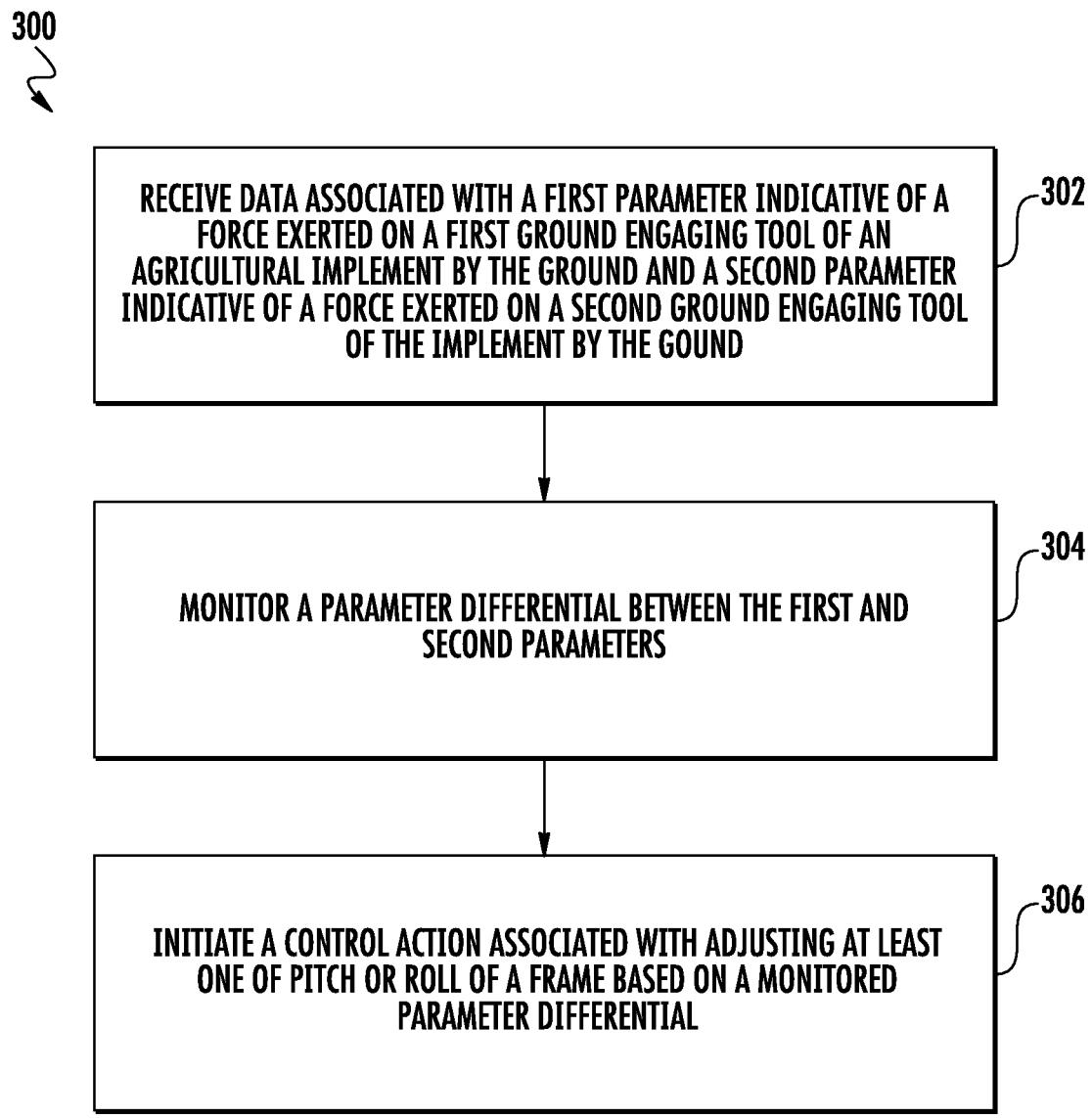
FIG. 11 illustrates a flow diagram of one embodiment of a method for monitoring frame levelness of an agricultural implement in accordance with aspects of the present subject matter.

Referring now to FIG. 11, a flow diagram of one embodiment of a method 300 for monitoring the frame levelness of an agricultural implement is illustrated in accordance with aspects of the present subject matter. In general, the method 300 will be described herein with reference to the implement 10, the ground engaging tool assemblies 100, and the system 200 described above with reference to FIGS. 1-9. However, it should be appreciated by those of ordinary skill in the art that the disclosed method 300 may generally be utilized to monitor the frame levelness for any agricultural implement having any suitable implement configuration and/or for any ground engaging tool assembly having any suitable ground engaging tool assembly configuration. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at (302), the method 300 may include receiving, with a computing device, data associated with a first parameter indicative of a force exerted on a first ground engaging tool of an agricultural implement by the ground and a second parameter indicative of a force exerted on a second ground engaging tool of the implement by the ground. For instance, as indicated above, the controller 202 may be communicatively coupled to sensors 120 configured to monitor parameters indicative of forces exerted on the ground engaging tools 38A, 38B, 38C, 38D, 38E, 38F by the soil. As such, measurement signals or sensor data 208 transmitted from the sensors 120 may be received by the controller 202 for monitoring the parameter values associated with the ground engaging tools 38A, 38B, 38C, 38D, 38E, 38F.

Additionally, at (304), the method 300 may include monitoring, with the computing device, a parameter differential between the first and second parameters. For instance, the controller 202 may be configured to compare the current parameter values associated with at least two of the ground engaging tools 38A, 38B, 38C, 38D, 38E, 38F to determine the parameter differential existing therebetween.

Moreover, as shown in FIG. 10, at (306), the method 300 may include initiating, with the computing device, a control action associated with adjusting at least one of pitch or roll of the frame based on a magnitude of the monitored parameter differential. As indicated above, the controller 202 may be configured to monitor the parameter differential relative to an associated parameter differential threshold (or relative to an associated parameter differential range). In the event that the parameter differential exceeds or falls below the parameter differential threshold (or falls outside the parameter differential range), the controller 202 may then implement a control action to adjust the associated roll and/or pitch of the frame 20 indicated by the parameter differential currently existing between the corresponding ground engaging tools 38A, 38B, 38C, 38D, 38E, 38F. As described above, such control actions may, in several embodiments, include controlling one or more components of the implement 10. For instance, the controller 202 may, in one embodiment, be configured to control one or more operator-interface components located within the work vehicle's cab to allow a visual and/or audible notification to be presented to the operator. In addition, or as an alternative thereto, the controller 202 may be configured to actively regulate the pressure of the fluid supplied within an associated actuator 220 (e.g., by electronically controlling the associated PRV 232) to adjust the relative position(s) between various components of the implement 10 and/or the relative position(s) between the implement 10 and the work vehicle 12. For example, in one embodiment, the actuator 220 may adjust the position of one or more of the wheels 32, 34 relative to the implement frame 20. In another embodiment, the actuator 220 may adjust the position of one of the wing sections 44, 46 of the frame 20 relative to the main section 42 of the frame 20. In further embodiment, the actuator 220 may adjust the position of the pull hitch 18 of the implement 10 relative to the work vehicle 12.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A system for monitoring frame levelness of an agricultural implement, the system comprising:
    an implement including a frame extending in a longitudinal direction between a forward end and an aft end and in a lateral direction between a first side and a second side, the implement further including first and second ground engaging tools coupled to the frame, the first and second ground engaging tools being spaced apart from each other in at least one of the longitudinal direction or the lateral direction of the implement;
    a first rotary sensor configured to detect a first position of the first ground engaging tool relative to the frame, the first position being indicative of a force exerted on the first ground engaging tool by the ground;
    a second rotary sensor configured to detect a second position of the second ground engaging tool relative to the frame, the second position being indicative of a force exerted on the second ground engaging tool by the ground; and
    a controller communicatively coupled to the first and second rotary sensors, the controller being configured to monitor a position differential between the first and second positions based on measurement signals received from the first and second rotary sensors, the monitored position differential being indicative of at least one of pitch or roll of the frame,
    wherein the controller is further configured to identify a time period across which the monitored position differential exceeds or falls below a predetermined position differential threshold and compare the identified time period to a threshold time period to determine when the frame has pitched or rolled,
    wherein the controller is further configured initiate a control action associated with adjusting the at least one of the pitch or the roll of the frame based on a magnitude of the monitored position differential to adjust an orientation of the frame relative to the ground.

2. The system of claim 1, wherein the first and second ground engaging tools are spaced apart from each other in the longitudinal direction, the monitored position differential being indicative of pitch of the frame.

3. The system of claim 1, wherein the first and second ground engaging tools are spaced apart from each other in the lateral direction, the monitored position differential being indicative of roll of the frame.

4. The system of claim 1, wherein the controller is configured to compare the monitored position differential to a maximum position differential threshold set for the implement, the controller being configured to initiate the control action when the monitored position differential exceeds the maximum position differential threshold.

5. The system of claim 1, wherein the controller is configured to compare the monitored position differential to a minimum position differential threshold, the controller being configured initiate the control action when the monitored position differential falls below the minimum position differential threshold.

6. The system of claim 1, wherein the implement further includes a hitch assembly coupled to the frame, the control action being associated with adjusting an orientation of the hitch assembly relative to the frame.

7. The system of claim 1, wherein the implement further includes a plurality of wheels, the control action being associated with adjusting a position of one or more of the wheels relative to the frame.

8. The system of claim 1, wherein the control action is associated with notifying an operator of the implement that the frame is not level due to pitching or rolling of the frame.

9. The system of claim 1, wherein the first and second ground engaging tools are pivotally coupled to the frame, the implement further including a first biasing element coupled between the frame and the first ground engaging tool, the first biasing element being configured bias the first ground engaging tool to a first predetermined tool position relative to the frame, the implement further including a second biasing element being coupled between the frame and the second ground engaging tool, the second biasing element being configured bias the second ground engaging tool to a second predetermined tool position relative to the frame, the first monitored position corresponding to a current position of the first ground engaging tool relative to the first predetermined tool position, the second monitored position corresponding to a current position of the second ground engaging tool relative to second the tool position.

10. The system of claim 1, wherein the controller is further configured to generate a field map that visually identifies a levelness of a field traversed by the implement based on the monitored position differential.

11. A method for monitoring frame levelness of an agricultural implement, the implement including a frame extending in a longitudinal between a forward end and an aft end and in a lateral direction between a first side and a second side, the implement further including first and second ground engaging tools coupled to the frame, the first and second ground engaging tools being spaced apart from each other in at least one of the longitudinal direction or the lateral direction of the implement, the method comprising:

receiving, with a computing device, data associated with a first parameter indicative of a force exerted on the first ground engaging tool by the ground and a second parameter indicative of a force exerted on the second ground engaging tool by the ground, the first parameter being at least one of a position of the first ground engaging tool relative to the frame or a fluid pressure associated with the first ground engaging tool, the second parameter being at least one of a position of the second ground engaging tool relative to the frame or a fluid pressure associated with the second ground engaging tool;

monitoring, with the computing device, a parameter differential between the first and second parameters, the monitored parameter differential being indicative of at least one of pitch or roll of the frame, identifying, with the computing device, a time period across which the monitored parameter differential exceeds or falls below a predetermined parameter differential threshold; and comparing, with the computing device, the identified time period to a threshold time period to determine when the frame has pitched or rolled, initiating, with the computing device, a control action associated with adjusting the at least one of the pitch or the roll of the frame based on a magnitude of the monitored parameter differential to adjust an orientation of the frame relative to the ground.

12. The method of claim 11, wherein the control action is initiated when the monitored parameter differential exceeds a maximum parameter differential threshold.

13. The method of claim 11, wherein the control action is initiated when the monitored parameter differential falls below a minimum parameter differential threshold.

14. The method of claim 11, wherein the control action comprises adjusting an orientation of the frame relative to a work vehicle to which the implement is coupled.

15. The method of claim 11, wherein the implement further includes a plurality of wheel assemblies, the control action comprising adjusting a position of one or more of the wheel assemblies relative to the frame.

16. The method of claim 11, wherein the control action is associated with notifying an operator of the implement that the frame is not level due to pitching or rolling of the frame.

17. The method of claim 11, wherein the first and second ground engaging tools are pivotally coupled to the frame, the implement further including a first biasing element coupled between the frame and the first ground engaging tool, the first biasing element being configured bias the first ground engaging tool to a first predetermined tool position relative to the frame, the implement further including a second biasing element being coupled between the frame and the second ground engaging tool, the second biasing element being configured bias the second ground engaging tool to a second predetermined tool position relative to the frame, the first parameter corresponding to at least one of a current position of the first ground engaging tool relative to first predetermined tool position or a fluid pressure associated with the first biasing element, the second parameter corresponding to at least one of a current position of the second ground engaging tool relative to second predetermined tool position or a fluid pressure associated with the second biasing element.

* * * * *